(12) United States Patent
Banerjee et al.

(10) Patent No.: US 10,154,082 B2
(45) Date of Patent: *Dec. 11, 2018

(54) PROVIDING CUSTOMER INFORMATION OBTAINED FROM A CARRIER SYSTEM TO A CLIENT DEVICE

(71) Applicant: Danal Inc., San Jose, CA (US)

(72) Inventors: Atreedev Banerjee, San Jose, CA (US); James Pardue, San Jose, CA (US)

(73) Assignee: Danal Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/458,025

(22) Filed: Aug. 12, 2014

(65) Prior Publication Data

US 2016/0050259 A1    Feb. 18, 2016

(51) Int. Cl.
| | | |
|---|---|---|
| *H04L 29/08* | (2006.01) | |
| *H04L 29/06* | (2006.01) | |
| *G06Q 30/06* | (2012.01) | |
| *G06Q 20/02* | (2012.01) | |
| *G06Q 20/34* | (2012.01) | |

(52) U.S. Cl.
CPC ............ *H04L 67/10* (2013.01); *G06Q 20/02* (2013.01); *G06Q 20/34* (2013.01); *G06Q 30/06* (2013.01); *H04L 63/0428* (2013.01); *H04L 63/0876* (2013.01); *H04L 67/42* (2013.01)

(58) Field of Classification Search
CPC ..... H04L 67/10; H04L 63/0876; H04L 67/42; H04L 63/0428; G06Q 20/34; G06Q 30/06; G06Q 20/02
See application file for complete search history.

(56) References Cited

U.S. PATENT DOCUMENTS

| 5,586,260 A | 12/1996 | Hu |
|---|---|---|
| 5,684,950 A | 11/1997 | Dare et al. |
| (Continued) | | |

FOREIGN PATENT DOCUMENTS

| CA | 2723173 C | 10/2013 |
|---|---|---|
| CN | 102184204 B | 3/2013 |
| (Continued) | | |

OTHER PUBLICATIONS

International Search Report and Written Opinion of the International Searching Authority for application No. PCT/US2015/043492, dated Oct. 30, 2015.

(Continued)

*Primary Examiner* — Jospeh P Hirl
*Assistant Examiner* — Stephen Gundry
(74) *Attorney, Agent, or Firm* — Haley Guiliano LLP

(57) ABSTRACT

Methods and systems are presented for accessing customer relationship management (CRM) information stored in a carrier system associated with a user of an identified client device. A client device is identified based on client device identification information received from a carrier system. CRM information associated with the identified client device is received from the carrier system, and data corresponding to at least a subset of the CRM information is output to the client device. The client device may be configured to pre-populate data fields of a transaction based on the data corresponding to at least a subset of the CRM information.

41 Claims, 14 Drawing Sheets

(56) References Cited

U.S. PATENT DOCUMENTS

| | | | |
|---|---|---|---|
| 5,875,296 | A | 2/1999 | Shi et al. |
| 5,918,232 | A | 6/1999 | Pouschine et al. |
| 6,606,663 | B1 | 8/2003 | Liao et al. |
| 6,678,731 | B1 | 1/2004 | Howard et al. |
| 6,934,706 | B1 | 8/2005 | Mancuso et al. |
| 7,039,714 | B1 | 5/2006 | Blakley, III et al. |
| 7,243,369 | B2 | 7/2007 | Bhat et al. |
| 7,356,559 | B1 | 4/2008 | Jacobs et al. |
| 7,373,659 | B1 | 5/2008 | Vignoles et al. |
| 7,735,122 | B1 | 6/2010 | Johnson et al. |
| 7,970,743 | B1 | 6/2011 | Kilday et al. |
| 8,176,186 | B2* | 5/2012 | McCanne ............... H03M 7/30 709/228 |
| 8,407,465 | B2 | 3/2013 | Naaman et al. |
| 8,645,282 | B2* | 2/2014 | Vakil ..................... G06Q 20/02 705/76 |
| 8,655,782 | B2 | 2/2014 | Poon et al. |
| 8,954,544 | B2* | 2/2015 | Edwards ............... G06Q 10/10 707/649 |
| RE45,615 | E* | 7/2015 | Bonalle ................. G06Q 20/00 |
| 9,159,063 | B1* | 10/2015 | McDonald ......... G06Q 20/3226 |
| 9,167,425 | B1* | 10/2015 | McDonald ............ H04W 12/04 |
| 9,317,704 | B2* | 4/2016 | Brudnicki ............. G06F 21/604 |
| 9,384,485 | B1* | 7/2016 | McDonald ........... G06Q 20/401 |
| 9,454,773 | B2* | 9/2016 | Leung ................. G06Q 30/0267 |
| 9,461,983 | B2* | 10/2016 | Banerjee ................ H04L 63/08 |
| 9,603,019 | B1* | 3/2017 | Ramatchandirane ........................ H04W 12/06 |
| 9,619,799 | B2* | 4/2017 | Haggerty ............... G06Q 20/36 |
| 9,665,898 | B2* | 5/2017 | Scholl ................ G06Q 30/0613 |
| 9,681,305 | B2* | 6/2017 | Colegate .............. H04W 12/08 |
| 9,727,894 | B2* | 8/2017 | Leung ................. G06Q 30/0257 |
| 9,741,030 | B2* | 8/2017 | Tavares ................ G06Q 20/322 |
| 9,792,598 | B2* | 10/2017 | Brudnicki ............ G06Q 20/206 |
| 9,805,366 | B1* | 10/2017 | Wilson ................. G06Q 20/382 |
| 9,836,743 | B2* | 12/2017 | Celikyilmaz .......... G06Q 20/40 |
| 9,892,401 | B2* | 2/2018 | Wallaja ................ G06Q 20/322 |
| 2001/0037469 | A1 | 11/2001 | Gupta et al. |
| 2001/0045451 | A1 | 11/2001 | Tan et al. |
| 2002/0156905 | A1 | 10/2002 | Weissman |
| 2002/0184217 | A1 | 12/2002 | Bisbee |
| 2003/0028451 | A1 | 2/2003 | Ananian |
| 2003/0074580 | A1 | 4/2003 | Knouse et al. |
| 2003/0115142 | A1 | 6/2003 | Brickell |
| 2004/0128542 | A1 | 7/2004 | Blakley, III et al. |
| 2004/0148410 | A1 | 7/2004 | Howard et al. |
| 2005/0005094 | A1 | 1/2005 | Jamieson et al. |
| 2005/0015490 | A1 | 1/2005 | Saare et al. |
| 2005/0055578 | A1 | 3/2005 | Wright et al. |
| 2005/0257072 | A1 | 11/2005 | Cross et al. |
| 2006/0023945 | A1* | 2/2006 | King ................... H04N 1/00244 382/173 |
| 2006/0156391 | A1 | 7/2006 | Salowey |
| 2007/0094503 | A1 | 4/2007 | Ramakrishna |
| 2007/0143829 | A1 | 6/2007 | Hinton et al. |
| 2008/0184351 | A1* | 7/2008 | Gephart ................. G06F 21/33 726/7 |
| 2008/0256593 | A1 | 10/2008 | Vinberg et al. |
| 2009/0006646 | A1 | 1/2009 | Duarte |
| 2009/0037605 | A1* | 2/2009 | Li .......................... G06Q 20/12 709/246 |
| 2009/0076949 | A1* | 3/2009 | Olliphant ............... G06Q 20/10 705/39 |
| 2009/0132405 | A1 | 5/2009 | Scipioni et al. |
| 2009/0132813 | A1 | 5/2009 | Schibuk |
| 2009/0144540 | A1 | 6/2009 | Davis et al. |
| 2009/0171900 | A1* | 7/2009 | Phillips ................ G06Q 10/107 |
| 2009/0210293 | A1 | 8/2009 | Steel et al. |
| 2010/0010932 | A1 | 1/2010 | Law et al. |
| 2010/0017596 | A1 | 1/2010 | Schertinger |
| 2010/0077208 | A1 | 3/2010 | Appiah |
| 2010/0114713 | A1* | 5/2010 | Anderson ............. G06Q 20/10 705/14.69 |
| 2010/0120408 | A1* | 5/2010 | Beenau .................. G06Q 30/06 455/419 |
| 2010/0154025 | A1 | 6/2010 | Esteve Balducci et al. |
| 2010/0199334 | A1 | 8/2010 | Ehrensvard et al. |
| 2011/0047132 | A1 | 2/2011 | Kilday et al. |
| 2011/0065418 | A1* | 3/2011 | Ryu ....................... G06Q 20/32 455/411 |
| 2011/0082767 | A1* | 4/2011 | Ryu ....................... G06Q 20/32 705/26.35 |
| 2011/0087880 | A1 | 4/2011 | Sorniotti et al. |
| 2011/0125565 | A1 | 5/2011 | MacIlwaine et al. |
| 2011/0145844 | A1* | 6/2011 | Shafi ...................... G06F 9/547 719/330 |
| 2011/0167470 | A1 | 7/2011 | Walker |
| 2011/0218868 | A1* | 9/2011 | Young .................. G06Q 20/045 705/16 |
| 2011/0231919 | A1 | 9/2011 | Vangpat et al. |
| 2011/0246363 | A1* | 10/2011 | Stone ..................... G06Q 20/02 705/44 |
| 2012/0041941 | A1* | 2/2012 | King ..................... G06F 17/218 707/711 |
| 2012/0084199 | A1 | 4/2012 | Stone |
| 2012/0124676 | A1 | 5/2012 | Griffin et al. |
| 2012/0150748 | A1 | 6/2012 | Law et al. |
| 2012/0150750 | A1 | 6/2012 | Law et al. |
| 2012/0167162 | A1 | 6/2012 | Raleigh |
| 2012/0226580 | A1* | 9/2012 | Raghavan ............... G06Q 30/06 705/26.41 |
| 2012/0227094 | A1 | 9/2012 | Begen et al. |
| 2012/0245985 | A1* | 9/2012 | Cho ....................... G06Q 20/16 705/14.23 |
| 2012/0246004 | A1 | 9/2012 | Book et al. |
| 2012/0275377 | A1 | 11/2012 | Lehane et al. |
| 2012/0284101 | A1* | 11/2012 | Schiller ................. G06Q 30/06 705/14.23 |
| 2012/0289188 | A1 | 11/2012 | Marcus et al. |
| 2013/0030934 | A1 | 1/2013 | Bakshi et al. |
| 2013/0054412 | A1* | 2/2013 | Brendell ................ G06Q 20/12 705/26.41 |
| 2013/0061333 | A1* | 3/2013 | Davis .................. H04L 63/0861 726/28 |
| 2013/0086656 | A1 | 4/2013 | Paddon et al. |
| 2013/0124413 | A1* | 5/2013 | Itwaru ................ G06Q 20/4012 705/44 |
| 2013/0198598 | A1* | 8/2013 | Kirsch .............. G06F 17/30899 715/226 |
| 2013/0226799 | A1* | 8/2013 | Raj ........................... G07C 9/00 705/44 |
| 2013/0290187 | A1* | 10/2013 | Itwaru ................ G06Q 20/3227 705/44 |
| 2013/0317925 | A1* | 11/2013 | Zhao ..................... G06Q 20/20 705/21 |
| 2013/0318589 | A1* | 11/2013 | Ford ....................... H04L 63/08 726/7 |
| 2013/0325611 | A1 | 12/2013 | Delug |
| 2013/0346329 | A1 | 12/2013 | Alib-Bulatao et al. |
| 2014/0047238 | A1 | 2/2014 | Harty et al. |
| 2014/0090045 | A1* | 3/2014 | Sanchez ................ G06Q 20/40 726/9 |
| 2014/0156531 | A1 | 6/2014 | Poon et al. |
| 2014/0201086 | A1* | 7/2014 | Gadotti ................ G06Q 20/322 705/72 |
| 2014/0244348 | A1 | 8/2014 | Zamani et al. |
| 2014/0249921 | A1 | 9/2014 | Nicklin et al. |
| 2014/0278978 | A1 | 9/2014 | O'Conner et al. |
| 2014/0279112 | A1* | 9/2014 | Ulrich ................... G06Q 20/322 705/21 |
| 2014/0279523 | A1* | 9/2014 | Lynam ............... G06Q 20/3226 705/44 |
| 2014/0281487 | A1* | 9/2014 | Klausen ............... H04L 63/0471 713/153 |
| 2014/0282836 | A1 | 9/2014 | Cai et al. |
| 2014/0344718 | A1 | 11/2014 | Rapaport et al. |
| 2014/0351126 | A1* | 11/2014 | Priebatsch ............. G06Q 20/40 705/44 |
| 2014/0373117 | A1 | 12/2014 | Le Saint |

(56) References Cited

U.S. PATENT DOCUMENTS

| | | | | |
|---|---|---|---|---|
| 2014/0373170 | A1* | 12/2014 | Brudnicki | G06F 21/604 726/27 |
| 2015/0006384 | A1* | 1/2015 | Shaikh | G06Q 20/4016 705/44 |
| 2015/0012436 | A1* | 1/2015 | Poole | G06Q 20/204 705/44 |
| 2015/0019402 | A1 | 1/2015 | Berlin et al. | |
| 2015/0032635 | A1* | 1/2015 | Guise | G06Q 20/356 705/72 |
| 2015/0066799 | A1* | 3/2015 | Scipioni | G06Q 10/083 705/337 |
| 2015/0073989 | A1* | 3/2015 | Green | G06Q 20/405 705/44 |
| 2015/0081462 | A1* | 3/2015 | Ozvat | G06Q 20/027 705/21 |
| 2015/0100442 | A1* | 4/2015 | Van Heerden | G06Q 20/20 705/16 |
| 2015/0100443 | A1* | 4/2015 | Van Heerden | G06Q 20/227 705/16 |
| 2015/0106893 | A1 | 4/2015 | Hou et al. | |
| 2015/0112864 | A1* | 4/2015 | Wallaja | G06Q 20/322 705/44 |
| 2015/0188777 | A1 | 7/2015 | Frost | |
| 2015/0195707 | A1* | 7/2015 | Sivaganesh | H04W 12/04 705/51 |
| 2015/0213542 | A1* | 7/2015 | Wallaja | G06O 30/0635 705/14.55 |
| 2015/0220713 | A1* | 8/2015 | Beenau | G06Q 20/32 726/19 |
| 2015/0235212 | A1* | 8/2015 | Ortiz | G06Q 20/40 705/44 |
| 2015/0278810 | A1* | 10/2015 | Ramatchandirane | G06Q 20/30 705/16 |
| 2015/0332228 | A1* | 11/2015 | Kimberg | G06Q 20/34 705/40 |
| 2015/0356556 | A1* | 12/2015 | Celikyilmaz | G06Q 40/12 705/14.51 |
| 2015/0356690 | A1* | 12/2015 | Celikyilmaz | G06Q 40/12 705/30 |
| 2016/0012428 | A1* | 1/2016 | Haldenby | G06Q 20/3572 705/39 |
| 2016/0019536 | A1* | 1/2016 | Ortiz | G06Q 20/3221 705/67 |
| 2016/0026997 | A1* | 1/2016 | Tsui | G06Q 20/322 705/75 |
| 2016/0034876 | A1* | 2/2016 | Speiser | G06Q 30/06 705/21 |
| 2016/0048877 | A1* | 2/2016 | Leung | G06Q 30/0267 705/14.51 |
| 2016/0050192 | A1* | 2/2016 | Banerjee | H04L 63/08 726/6 |
| 2016/0063496 | A1* | 3/2016 | Royyuru | G06Q 20/209 705/71 |
| 2016/0080944 | A1* | 3/2016 | Colegate | H04W 12/08 455/410 |
| 2016/0140582 | A1* | 5/2016 | Steele | G06Q 10/00 705/7.29 |
| 2016/0253645 | A1* | 9/2016 | Ciabarra | G06Q 20/204 705/21 |
| 2016/0267477 | A1* | 9/2016 | McDonald | G06Q 20/3829 |
| 2016/0300202 | A1* | 10/2016 | Xu | G06F 17/30867 |
| 2016/0300224 | A1* | 10/2016 | Liu | G06F 21/34 |
| 2016/0364959 | A1* | 12/2016 | Giddy | G06Q 30/04 |
| 2017/0061435 | A1* | 3/2017 | Armes | G06Q 20/4012 |
| 2017/0116596 | A1* | 4/2017 | Tsui | G06Q 20/353 |
| 2017/0154297 | A1* | 6/2017 | Chenu | G06Q 10/063112 |
| 2017/0161735 | A1* | 6/2017 | Ortiz | G06Q 20/3829 |
| 2017/0161749 | A1* | 6/2017 | Shaikh | G06Q 20/4016 |
| 2017/0270509 | A1* | 9/2017 | Colegate | G06Q 20/3223 |
| 2017/0278097 | A1* | 9/2017 | Haggerty | G06Q 20/36 |
| 2017/0300917 | A1* | 10/2017 | Tavares | G06Q 20/4014 |
| 2017/0302641 | A1* | 10/2017 | Ramatchandirane | H04L 63/0492 |
| 2017/0372405 | A9* | 12/2017 | Wallaja | G06Q 30/0635 |
| 2018/0053170 | A1* | 2/2018 | Brudnicki | G06Q 20/206 |

FOREIGN PATENT DOCUMENTS

| | | | |
|---|---|---|---|
| EP | 1560394 A1 | 8/2005 | |
| GB | 2507725 A | 5/2004 | |
| GB | 2507725 A * | 5/2014 | H04M 15/44 |
| KR | 20030024127 A | 3/2003 | |
| KR | 20110129330 | 12/2011 | |
| KR | 101107191 B1 | 1/2012 | |
| WO | 2006016375 A1 | 2/2006 | |
| WO | 2010008397 A1 | 1/2010 | |
| WO | WO 2013/008056 A1 | 1/2013 | |

OTHER PUBLICATIONS

EPO Form 1507N, Extended European Search Report and Search Opinion, from the European Patent Office in European Patent Application No. 15158564.3 dated Dec. 2, 2015.

Stubblebine, Stuart G. "Recent-Secure Authentication: Enforcing Revocation in Distributed Systems." Security and Privacy, 1995. Proceedings., 1995 IEEE Symposium on. IEEE, 1995.

Novotny, Jason, et al. "An Online Credential Repository for the Grid: MyProxy.: High Performance Distributed Computing." 2001. Proceedings. 10th IEEE International Symposium on. IEEE, 2001.

Aubry, Pascal, et al. "ESUP-Portail: open source single sign-on with CAS (Central Authentication Service)." Proc. of EUNIS04-IT Innovation in a Changing World (2004).

Nobayashi, Daiki, et al. "Development of Single Sign-On System with Hardware Token and Key Management Server." IEICE Transactions on Information and Systems 92.5 (2009).

International Search Report and Written Opinion of the International Searching Authority for application No. PCT/US2015/043494, dated Oct. 29, 2015.

International Search Report and Written Opinion of the International Searching Authority for application No. PCT/US2015/043493, dated Nov. 30, 2015.

EPO Form 1507N, Extended European Search Report and Search Opinion, from the European Patent Office in European Patent Application No. 15158569.2 dated Mar. 10, 2016.

\* cited by examiner

PROVIDING CUSTOMER INFORMATION OBTAINED FROM A CARRIER SYSTEM TO A CLIENT DEVICE

The present disclosure relates to transactions made on a client device, and more particularly relates to accessing customer relationship management (CRM) information stored in a carrier system associated with a user of an identified client device.

SUMMARY

Methods and systems are provided for receiving customer relationship management (CRM) information associated with an identified client device and providing the information to the client device. In some embodiments, the client device may be configured to pre-populate data fields associated with a transaction. Typically, transactions require information, including payment information, which may be tedious and difficult to enter on a client device, such as a mobile phone. Accordingly, an aggregator system of the present disclosure may receive CRM information associated with a client device based on an identification of the client device, and the CRM information may be used to pre-populate data fields on the client device. The CRM information may be received from any suitable source, such as a carrier system associated with the client device. Thus, a consumer need not be required to manually complete data fields related to client device transactions.

In some embodiments, an aggregator system receives client device information from a carrier system and identifies a client device based on the client device identification information. The aggregator system further receives CRM information from the carrier system and outputs data corresponding to at least a subset of the CRM information to the client device based at least in part on the client device identification information, where the client device is configured to pre-populate data fields based on the data corresponding to at least a subset of the CRM information.

In some embodiments, an aggregator method includes identifying a client device based on client device identification information received from a carrier system. The aggregator method further includes receiving CRM information from the carrier system and outputting data corresponding to at least a subset of the CRM information to the client device based at least in part on the client device identification information, where the client device is configured to pre-populate data fields based on the data corresponding to the least a subset of the CRM information.

In some embodiments, a non-transitory computer readable medium has stored instructions that when executed direct a carrier input to receive client device identification information from a carrier system, and direct client device identification circuitry to identify a client device based on the client device identification information. When executed, the instructions further direct a carrier input to receive CRM information from the carrier system and communication circuitry to output data corresponding to at least a subset of the CRM information to the client device based at least in part on the client device identification information. The client device is configured to pre-populate data fields based on the data corresponding to at least a subset of the CRM information.

In some embodiments, an aggregator system receives client device identification information from a merchant system and identifies a client device based on the client device identification information. The aggregator system further receives CRM information from a carrier system and outputs data corresponding to at least a subset of the CRM information to the client device based at least in part on the client device identification information, where the client device is configured to pre-populate data fields based on the data corresponding to at least a subset of the CRM information.

In some embodiments, an aggregator method includes identifying a client device based on client device identification information received from a merchant system. The aggregator method further includes receiving CRM information from a carrier system and outputting data corresponding to at least a subset of the CRM information to the client device based at least in part on the client device identification information, where the client device is configured to pre-populate data fields based on the data corresponding to the least a subset of the CRM information.

In some embodiments, a non-transitory computer readable medium has stored instructions that when executed direct a merchant input to receive client device identification information from a merchant system, and direct client device identification circuitry to identify a client device based on the client device identification information. When executed, the instructions further direct a carrier input to receive CRM information from a carrier system and communication circuitry to output data corresponding to at least a subset of the CRM information to the client device based at least in part on the client device identification information. The client device is configured to pre-populate data fields based on the data corresponding to at least a subset of the CRM information.

BRIEF DESCRIPTION OF THE FIGURES

The above and other features of the present disclosure, its nature and various advantages will be more apparent upon consideration of the following detailed description, taken in conjunction with the accompanying drawings in which.

DETAILED DESCRIPTION OF THE FIGURES

The present disclosure is directed towards using customer relationship management (CRM) information stored at a carrier system in connection with a transaction at a client device. For example, the CRM information may be used to pre-populate fields of a form being displayed on the client device. The client device may be for example, a mobile phone owned by a user having an account with the carrier system. The carrier system provides mobile network services to the client device. In the United States, examples of carrier systems include systems operated by Verizon, AT&T, and Sprint, among others. CRM information, as referred to herein, is understood to refer to any suitable user-specific data, including personal information such as, for example, name, address, telephone number, email, client device location, and payment information. A carrier system typically stores CRM information associated with its users. Attempts are made by the carrier system to keep its stored CRM information secure because of the sensitive nature of the personal information contained therein.

In accordance with the present disclosure, a system is provided that is configured to access CRM information stored at the carrier system and to provide the CRM information to a client device to be used in, for example, a transaction between the client device and a separate merchant system. In some embodiments, this is accomplished by identifying the client device, authenticating the user of the client device, and providing the client device with the ability to make application programming interface (API) calls to the carrier system (e.g., directly or through a conduit aggregator system trusted by the carrier system). This allows data to reach the merchant system without the need for the merchant system to communicate with the carrier system directly.

The client device may use the CRM information accessed from the carrier system for any suitable purpose, including, for example, populating corresponding fields of a form to be electronically submitted to a merchant system as part of a transaction. As used herein, the term "transaction" shall be understood to include within its scope any suitable transaction, registration, any other suitable process, or any combination thereof. For example, a client device may use data corresponding to at least a subset of the CRM information to pre-populate data fields for a purchase transaction with a merchant system.

Figure 1:
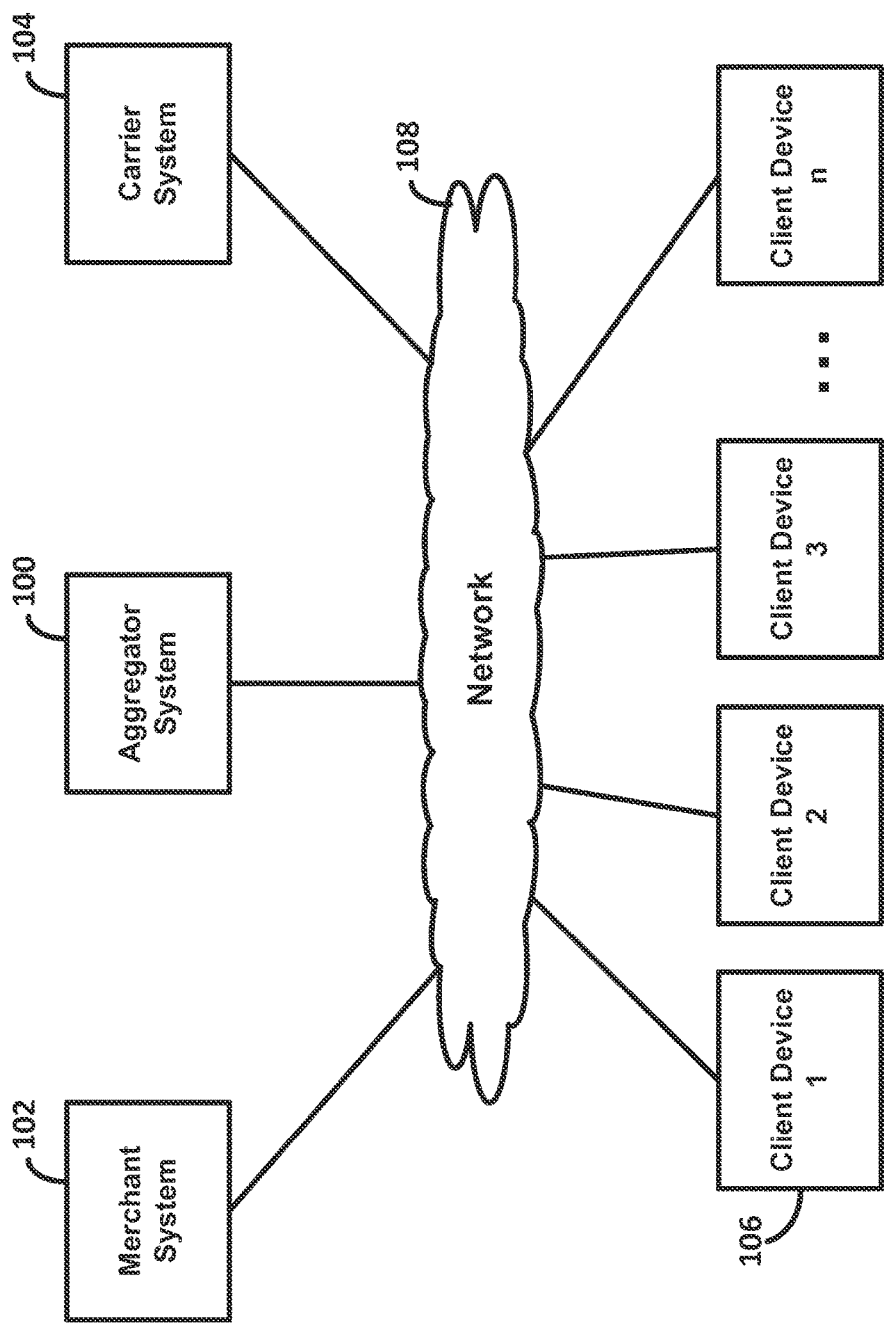
FIG. 1 is a block diagram of illustrative systems and devices implemented in a network environment in accordance with some embodiments of the present disclosure.

FIG. 1 is a block diagram of illustrative systems and devices implemented in a network environment in accordance with some embodiments of the present disclosure. Aggregator system 100, merchant system 102, carrier system 104, and client device 106 may be coupled via network 108. Network 108 may include or communicate with any suitable one or more network structure or structures, such any suitable local area network (LAN), wide area network (WAN) (e.g., the internet), wireless local area network (WLAN), a mobile communications network, any other suitable network, or any combination thereof. In some embodiments, network 108 may be a carrier network provided and operated by carrier system 104. The lines coupling network 108 to the various systems and devices may represent a wireless coupling, a wired coupling, any other suitable coupling, or any combination thereof. For example, devices and systems may be connected to network 108 through a WiFi or Ethernet connection, with access to the internet. In another example, client device 106 may be coupled to network 108 using one or more mobile communications networks, such as a 3G, 4G, LTE, cellular network, any other suitable mobile communications network, or any combination thereof.

Aggregator system 100 may be any suitable system which acts as an intermediary between two or more systems, such as between client device 106 and carrier system 104, merchant system 102 and carrier system 104, client device 106 and merchant system 102, between any other systems and devices, or any combination thereof. Aggregator system 100 may act as an intermediary by facilitating the communication of information, such as payment information (e.g. credit card information, PayPal information, routing number data, bank account information, billing address, legal name, social security number, any other suitable information related to making a payment, or any combination thereof) and/or registration information (e.g., name, address, email, phone number, social security number, payment information, any other suitable information, or any combination thereof), between two systems. Aggregator system 100 may be trusted by carrier system 104, and may access CRM information stored in carrier system 104 for secure communication to merchant system 102 or client device 106. An example of aggregator system 100 is the system developed and operated by Danal Inc. (doing business as BilltoMobile) located in San Jose, Calif., which provides mobile payment services to merchants using data provided by United States carrier systems. In some embodiments of the present disclosure, aggregator system 100 may be configured to provide CRM information to client device 106 or merchant system 102 for use in a transaction via network 108.

Merchant system 102 may be any suitable one or more entities capable of entering into a transaction with a client device. Examples of a transaction include a purchase transaction for goods, services, or both provided by merchant system 102, a money transfer, a bill payment, a transaction that results in access to banking information, banking services, or both, any other suitable transaction, or any combination thereof. Merchant system 102 may include, for example, a web server that publishes a website which requires personal information (e.g., payment information, registration information). Examples of merchant system 102 include systems operated by Amazon.com, Citibank, freecreditscore.com, among others. In some embodiments, merchant system 102 may be configured to communicate with client device 106 (e.g., enable a transaction) using network 108.

Carrier system 104 may be any suitable system which provides mobile network services to client device 106. Providing mobile network services to client device 106 may include providing a carrier network to client device 106. For example, a carrier system may be a system operated by Verizon, Sprint, or AT&T.

Client device 106 is any suitable hardware, software, or both that can be used to conduct a transaction with merchant system 102 using the carrier network provided by carrier system 104. In some embodiments, a client device of the present disclosure may be a mobile phone. A mobile phone may be associated with a mobile phone number, a carrier system, any other mobile phone identification information, or any combination thereof. A client device may be a tablet device, laptop device, any other suitable client device, mobile or otherwise, or any combination thereof. In some embodiments, carrier system 104 may include or have access to CRM information associated with client device 106, and may be configured to communicate the CRM information to aggregator system 100 via network 108.

Figure 2:
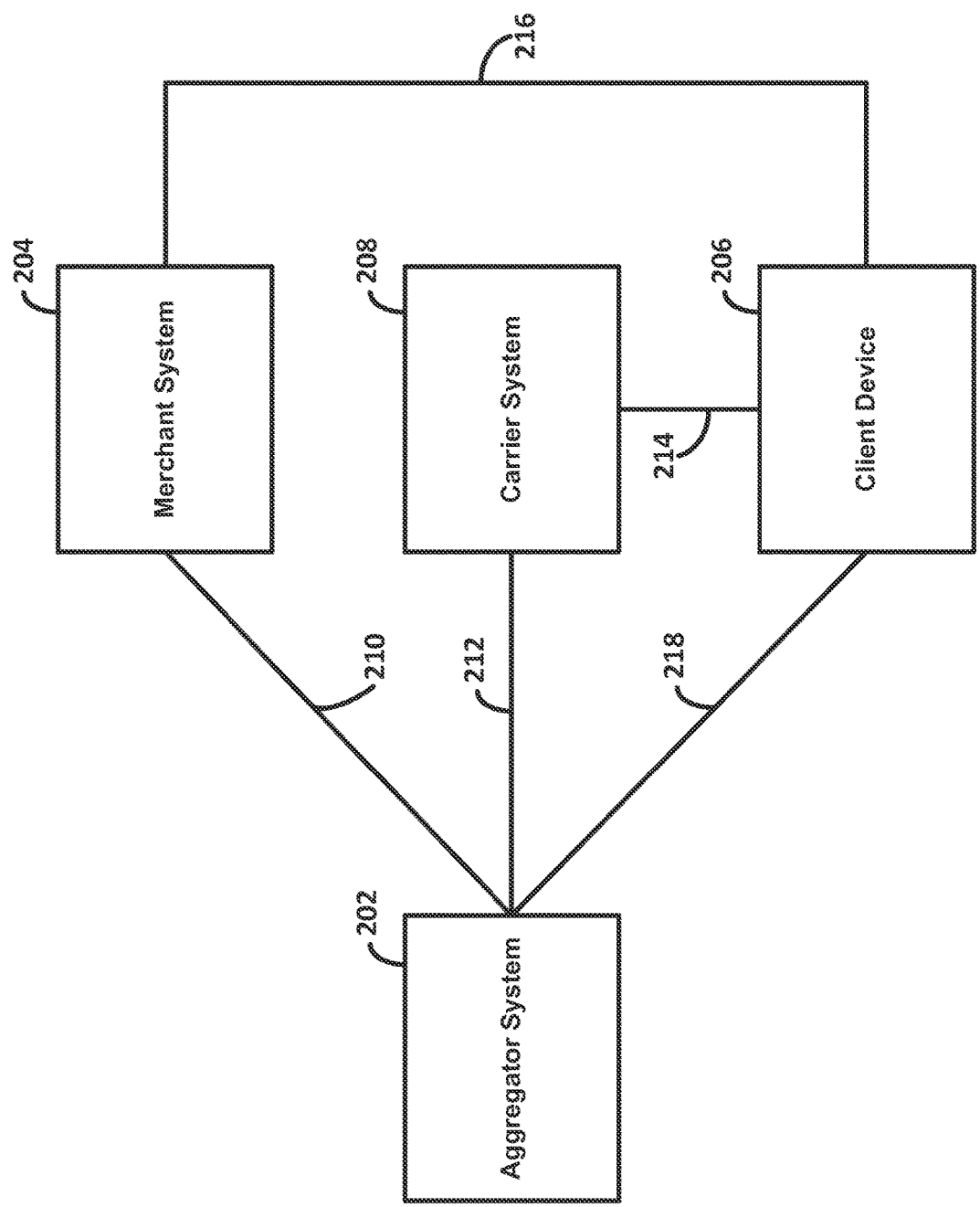
FIG. 2 is a block diagram showing illustrative paths of communication between systems and devices in accordance with some embodiments of the present disclosure.

FIG. 2 is block diagram showing illustrative paths of communication between the systems and devices of FIG. 1 in accordance with some embodiments of the present disclosure. Aggregator system 202 may be configured to communicate with merchant system 204, carrier system 208, and client device 206 via communications channels 210, 212, and 218 respectively. Merchant system 204 may be configured to communicate with aggregator system 202 and client device 206 via communication channels 210 and 218 respectively. Client device 206 may be configured to communicate with merchant system 204, aggregator system 202, and carrier system 208 via communication channels 216, 218, and 214 respectively. Carrier system 208 may be configured to communicate with aggregator system 202 and client device 206 via communication channels 212 and 214 respectively. Communication between systems and devices may include communicating over a network, such as network 108 of FIG. 1, and may include receiving data, sending data, or both.

Figure 3:
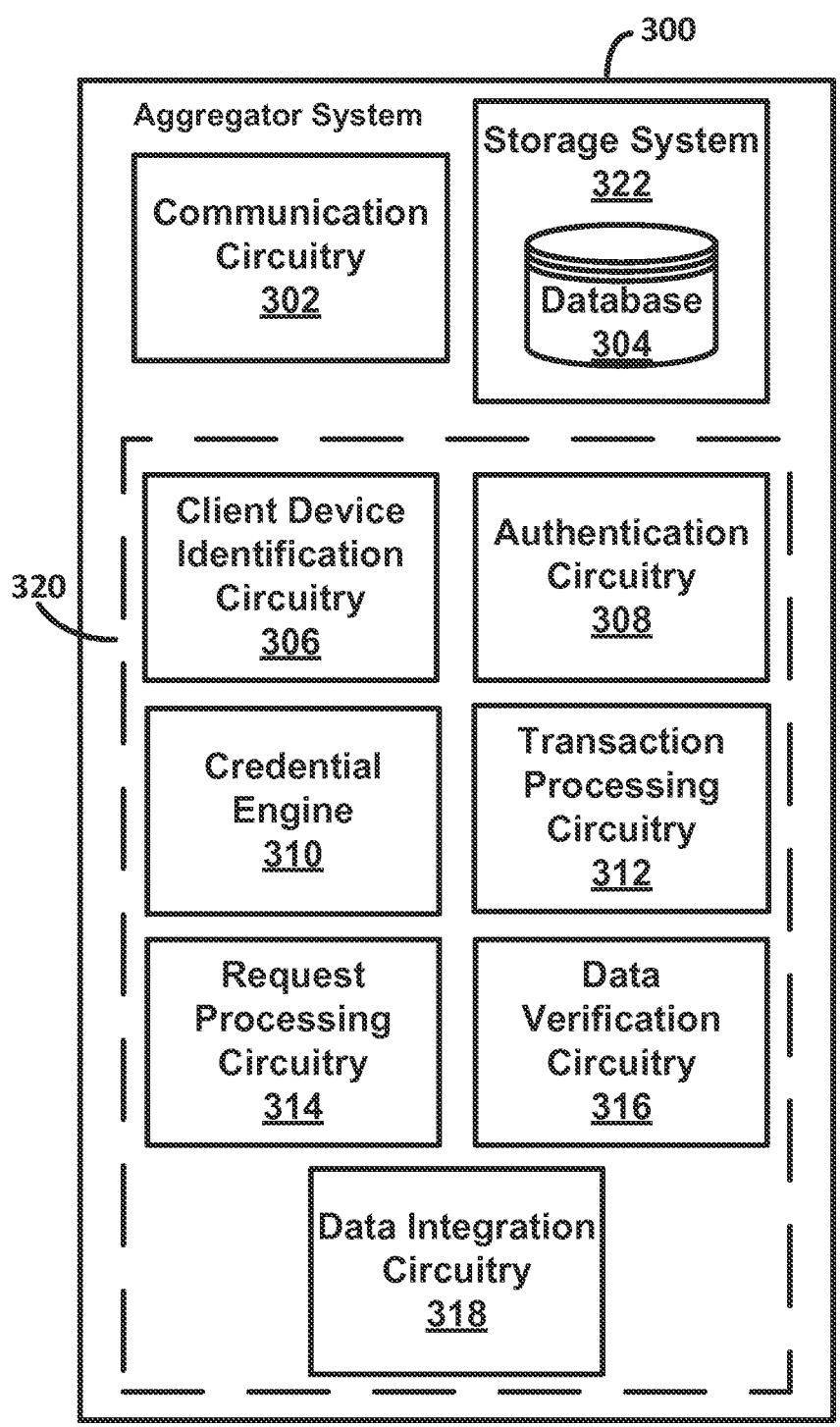
FIG. 3 is a block diagram of an illustrative aggregator system in accordance with some embodiments of the present disclosure.

FIG. 3 is a block diagram of illustrative aggregator system 300 in accordance with some embodiments of the present disclosure. Aggregator system 300 may be any suitable aggregator system, such as aggregator system 100 of FIG. 1 or aggregator system 202 of FIG. 2. In some embodiments, aggregator system 300 may be implemented in a network environment, such as that of FIG. 1. Aggregator system 300 may include any suitable software, hardware, or both configured to implement the features as described herein. For example, aggregator system 300 may include server hardware and software. Aggregator system 300 may include communication circuitry 302, storage system 322, and processing equipment 320.

Communication circuitry 302 may be configured with any suitable software, hardwired instructions, or both to communicate with database 304 and processing equipment 320, and may include inputs, outputs, any other mechanisms which facilitate communication with other systems and devices, or any combination thereof. An input or output is a relative communication channel that can be used to receive or send data, respectively. A communication channel may be established as, for example, an IP protocol-based communications session using any suitable network infrastructure, including the Internet, any proprietary LAN, WAN, any other suitable network infrastructure, or any combination thereof. Inputs and outputs can be implemented as one or more physical ports, a data storage device, any other suitable hardware interface, software interface, or any combination thereof. For example, aggregator system 300 may include a carrier input coupled to a carrier system and configured to receive data from the carrier system, a carrier output coupled to the carrier system and configured to output data to the carrier system, a merchant input coupled to a merchant system and configured to receive data from the merchant system, a merchant output coupled to the merchant system and configured to output data to the merchant system, a client device input coupled to a client device and configured to receive data from the client device, a client device output coupled to the client device and configured to output data to the client device, any other suitable input or output, or any combination thereof. While different inputs and outputs are described, it will be understood that they need not be separate components and two or more of the inputs and/or outputs may be implemented as a single component that can be used to send or receive data relative to more than one destination or source, respectively. For example, communication circuitry 302 may include a transceiver, such as an Ethernet card, or any other suitable device or circuitry which facilitates communication with other systems and devices.

Storage system 322 may include any suitable hardware, software, or both for implementing an organized data storage system capable of storing one or more databases and information related to, for example, merchant data, client device data, user data, authentication, rules, and carrier data. For example, storage system 322 may include database 304. In some embodiments, storage system 322 may store information which is not stored in database 304, such as information related to, for example application programming interfaces (APIs), HTML for content pages, any other suitable information, and any combination thereof.

Database 304 may include any suitable hardware, software, or both for implementing an organized data storage system capable of storing information related to, for example, merchant data, client device data, user data, and carrier data. Information related to merchant data may include, for example, stock keeping units (SKUs) related to goods for sale, customer service contact information (e.g., a phone number, an email address, a hyperlink for a website), data related to criteria for revoking authentication, any other merchant data, or any combination thereof. Information related to client device data may include, for example, a mobile device number, identification information associated with a client device, any other client device data, or any combination thereof. In some embodiments, database 304 may store encrypted information. For example, hashed information may be generated using a hash operation, and the hashed information may be stored in database 304. It should be understood that aggregator system 300, or any processing equipment or database thereof, such as database 304, may temporarily store CRM information associated with a user solely for the purpose of providing information where aggregator system 300 acts as an intermediary between systems and client devices, such that the user's privacy is preserved. For example, aggregator system 300 may temporarily store CRM information associated with a user of a client device until the information is communicated to a merchant system, where aggregator system 300 is configured to act as an intermediary between the merchant system and the client device. If aggregator system 300, or any processing equipment or database thereof is deemed to be a trusted system by a carrier system that stores CRM information, and if permission is granted to aggregator system 300 by the carrier system, then aggregator system 300 or any processing equipment or database thereof may be configured to store CRM information.

Processing equipment 320 may be any suitable hardware, software, or both configured to process data received from other systems and devices (e.g., a client device, a merchant system, a carrier system, or any other suitable system or device), process data to be output to other systems and devices, generate data (e.g., generate authentication information), analyze data (e.g., identify a client device based on identification information), and perform other tasks. In some embodiments, processing equipment 320 may include one or more circuitries for performing the functionality as described herein, such as client device identification circuitry 306, authentication circuitry 308, credential engine 310, transaction processing circuitry 312, request processing circuitry 314, data verification circuitry 316, data integration circuitry 318, any other suitable processing equipment, or any combination thereof. The circuitries within processing equipment 320 may communicate with one another to implement the features as described herein. Additionally, the circuitries within processing equipment 320 may all be implemented together on one or more devices. In some embodiments, processing equipment 320 may communicate with communication circuitry 302 and database 304 to retrieve or transmit information (e.g. identification information, authentication information, any other suitable information, or any combination thereof). For example, processing equipment 320 may send identifying information associated with a client device, such as a mobile phone number, to database 304 to retrieve additional information related to the client device or user in possession of the client device.

Client device identification circuitry 306 may be configured with any suitable software, hardwired instructions, or both to identify a client device based on client device identification information. For example, client device identification circuitry 306 may be at least a portion of one or more integrated circuit processors. Identifying a client device may enable aggregator system 300 to access information associated with the client device, to communicate with the client device, to authenticate the client device, to process a transaction on the client device, to perform any other suitable action, or any combination thereof. A client device may be identified, for example, by way of a mobile originated (MO) message identification technique, a mobile terminated (MT) identification technique, a header enrichment identification technique, any other suitable identification technique, or any combination thereof. In some embodiments, client device identification circuitry 306 may be configured to store client device identification information in a database, such as database 304, and may be configured to identify a client device based at least in part on information stored in database 304. Client device identification information may include, for example, information identifying a mobile phone number associated with the client device, information identifying a carrier system associated with the client device, information identifying software or hardware of the client device, information identifying a user in possession of the client device, any other suitable identification information, or any combination thereof. For example, client device identification circuitry 306 may identify a client device by identifying and storing a mobile phone number associated with a client device based on client device identification information which is received from a carrier system.

Authentication circuitry 308 may be configured with any suitable software, hardwired instructions, or both to authenticate a client device. For example, authentication circuitry 308 may be at least a portion of one or more integrated circuit processors. In some embodiments, authenticating a client device may allow the client device to receive or request protected information (e.g., payment information), for example, as a part of a transaction. Authenticating a client device may include authenticating a user in possession of the client device. In some embodiments, authenticating a user in possession of a client device may include verifying the identity of the user. Verifying a user's identity may include, for example, requesting the user to provide uniquely identifying information, requesting the user to provide a unique one-time pin, requesting the user to send a particular MO message, requesting the user to send a particular silent MO message, requesting the user to complete any other suitable request, or any combination thereof. In some embodiments, authenticating a client device may include comparing any provided information related to a user in possession of a client device to any information stored in database 304, for example, to detect differences between the provided information and the information stored in database 304. In some embodiments, authentication circuitry 308 may be further configured to generate data which can be used to prove authentication, such as authentication keys, credential information, any other suitable information, or any combination thereof. For example, authentication circuitry 308 may be configured to generate credentials for an authenticated user in possession of a client device.

Credential engine 310 may be any suitable hardware, software, or both configured to determine criteria for revoking authentication for an identified client device. Revoking authentication for an identified client device may prohibit the client device from participating in interactions which require authentication (e.g., requesting protected information for use in a transaction). In some embodiments, revoking authentication for an identified client device may include invalidating credentials for an authenticated user in possession of the client device. Credential engine 310 may be configured to define criteria based on rules for revoking authentication received from a plurality of interested parties. Criteria may include events and conditions which, when met, indicate that authentication should be revoked. The rules received from a plurality of interested parties may comprise multiple types, and in some embodiments credential engine 310 may determine criteria which comprise only one rule of each type. Credential engine 310 may be configured to combine rules received from a plurality of interested parties based on a priority associated with each rules. Interested parties may be any suitable source from which information associated with the client device may be received (e.g. carrier systems, financial institutions, utility companies, government organizations, universities, schools, any other suitable sources, or any combination thereof), a country in which the client device operates, any other suitable interested party, or any combination thereof.

Transaction processing circuitry 312 may be configured with any suitable software, hardwired instructions, or both to process a transaction on a client device, such as client device 106 of FIG. 1. For example, transaction processing circuitry 312 may be at least a portion of one or more integrated circuit processors. In some embodiments, transaction processing circuitry 312 may use information stored in database 304 to process a transaction. Processing a transaction may include, for example, submitting payment information, completing a sale, any other suitable process, or any combination thereof. For example, a user attempting to make a purchase transaction on a client device may be redirected from a webpage of a merchant system to a webpage associated with aggregator system 300, and transaction processing circuitry 312 may process the purchase transaction.

Request processing circuitry 314 may be configured with any suitable software, hardwired instructions, or both to process requests from other systems and devices, such as merchant system 102 of FIG. 1, carrier system 104 of FIG. 1, and client device 106 of FIG. 1. For example, request processing circuitry 314 may be at least a portion of one or more integrated circuit processors. Requests may include a request to output information, a request to accept information, such as a rule, a request to validate information, a request to process a transaction, any other suitable request, or any combination thereof. In some embodiments, one or more requests may be received by communication circuitry 302, and passed from communication circuitry 302 to request processing circuitry 314. Request processing circuitry 314 may determine any suitable response to each of the one or more requests, such as processing information, retrieving information, transmitting information, any other suitable response, or any combination thereof. In some embodiments, request processing circuitry 314 may be configured to process and/or respond to requests received from other circuitries within processing equipment 320. For example, request processing circuitry 314 may receive a request for information associated with a client device, and may in response retrieve information from database 304 and communicate the information to communication circuitry 302 to be output.

Data verification circuitry 316 may be configured with any suitable software, hardwired instructions, or both to verify information associated with a client device, such as client device 106 of FIG. 1. For example, data verification module 316 may be at least a portion of one or more integrated circuit processors. In one embodiment, aggregator system 300 may receive information associated with a client device from one or more sources, and data verification circuitry 316 may be configured to verify the information. In another embodiment, request processing circuitry 314 may receive a request from a merchant system to verify information associated with a client device, and data verification circuitry 316 may verify the information. Verification may include comparing received information to information stored in database 304, comparing received information to information received from one or more sources, deterministic matching, probabilistic matching, fuzzy matching, any other suitable verification technique, or any combination thereof. In some embodiments, verifying information associated with a client device may include verifying information associated with a user in possession of the client device.

Data integration circuitry 318 may be configured with any suitable software, hardwired instructions, or both to integrate information associated with a client device which is received from one or more sources. For example, data integration circuitry 318 may be at least a portion of one or more integrated circuit processors. In one embodiment, aggregator system 300 may receive information associated with a client device from one or more sources, and data integration circuitry 318 may integrate the data received from the one or more sources. Data integration may include, for example, eliminating inconsistencies between information from different sources or between information received from one source and information stored in a database (e.g., database 304), eliminating duplicate information from different sources or between information received from one source and information stored in a database (e.g., database 304), any other suitable integration technique, or any combination thereof. Sources may include interested parties such as, for example, carrier systems, financial institutions, utility companies, government organizations, universities, schools, any other suitable sources, or any combination thereof.

Figure 4:
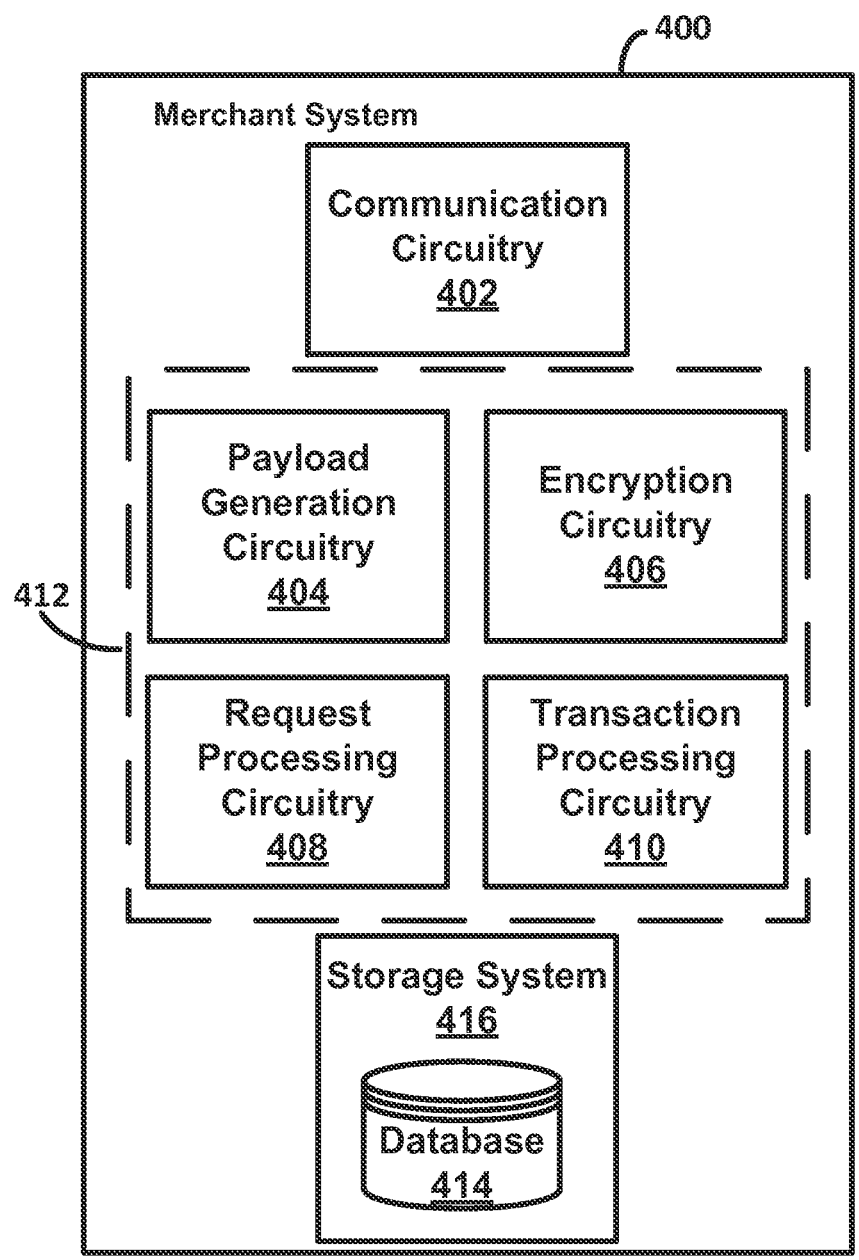
FIG. 4 is a block diagram of an illustrative merchant system in accordance with some embodiments of the present disclosure.

FIG. 4 is a block diagram of illustrative merchant system 400 in accordance with some embodiments of the present disclosure. Merchant system 400 may be any suitable merchant system, for example, merchant system 102 of FIG. 1 or merchant system 204 of FIG. 2. In some embodiments, merchant system 400 may be implemented in a network environment, such as that of FIG. 1. Merchant system 400 may include any suitable software, hardware, or both configured to implement the features as described herein. For example, merchant system 400 may include server hardware and software. Merchant system 400 may include communication circuitry 402, storage system 416, and processing equipment 412.

Communication circuitry 402 may be configured with any suitable software, hardwired instructions, or both to communicate with database 414 and processing equipment 412, and may include inputs, outputs, any other mechanisms which facilitate communication with other systems and devices, or any combination thereof. An input or output is a relative communication channel that can be used to receive or send data, respectively. A communication channel may be established as, for example, an IP protocol-based communications session using any suitable network infrastructure, including the Internet, any proprietary LAN, WAN, any other suitable network infrastructure, or any combination thereof. Inputs and outputs can be implemented as one or more physical ports, a data storage device, any other suitable hardware interface, software interface, or any combination thereof. For example, merchant system 400 may include a carrier input coupled to a carrier system and configured to receive data from the carrier system, a carrier output coupled to the carrier system and configured to output data to the carrier system, an aggregator input coupled to an aggregator system and configured to receive data from the aggregator system, an aggregator output coupled to the aggregator system and configured to output data to the aggregator system, a client device input coupled to a client device and configured to receive data from the client device, a client device output coupled to the client device and configured to output data to the client device, any other suitable input or output, or any combination thereof. In the context of the present disclosure, it may be preferential for merchant system 400 to not include a carrier input and a carrier output. That is, merchant system 400 need not be able to communicate with a carrier system in preferred embodiments of the present invention. While different inputs and outputs are described, it will be understood that they need not be separate components and two or more of the inputs and/or outputs may, indeed be implemented as a single component that can be used to send or receive data relative to more than one destination or source, respectively. For example, communication circuitry 402 may include a transceiver, such as an Ethernet card, or any other suitable device or circuitry which facilitates communication with other systems and devices.

Storage system 416 may include any suitable hardware, software, or both for implementing an organized data storage system capable of storing one or more databases and information related to, for example, merchant data, client device data, user data, authentication, rules, and carrier data. For example, storage system 416 may include database 414. In some embodiments, storage system 416 may store information which is not stored in database 414, such as information related to merchant data, for example APIs, HTML for content pages, any other suitable information, and any combination thereof. In some embodiments, merchant system 400 may be configured to communicate any information stored in storage system 416 or in database 414 to a trusted aggregator system, such as aggregator system 300.

Database 414 may include any suitable hardware, software, or both for implementing an organized data storage system capable of storing information related to, for example, merchant data, client device data, user data, and carrier data. Information related to merchant data may include, for example, SKUs related to goods for sale, customer service contact information (e.g., a phone number, an email address, a hyperlink for a website), payload information, data related to criteria for revoking authentication, any other merchant data, or any combination thereof. Information related to client device data may include, for example, a mobile device number, identification information associated with a client device, any other client device data, or any combination thereof. Information related to user data may include, for example, authentication information for an authenticated user, credential information for an authenticated user, any other user related information, or any combination thereof. Carrier data may include, for example, the carrier network associated with a client device. In some embodiments, database 414 may store information in an encrypted form. For example, hashed information may be generated using a hash operation, and the hashed information may be stored in database 414.

Processing equipment 412 may be any suitable hardware, software, or both configured to process data received from other systems and devices (e.g., a client device, an aggregator system, or any other suitable system or device), process data to be output to other systems and devices, generate data, analyze data (e.g., confirm authentication information provided by a client device), and perform other tasks. In some embodiments, processing equipment 412 may include one or more circuitries for performing the functionality as described herein, such as payload generation circuitry 404, encryption circuitry 406, request processing circuitry 408, transaction processing circuitry 410, any other suitable processing equipment, or any combination thereof. The circuitries within processing equipment 412 may communicate with one another to implement the features described herein. Additionally, the circuitries within processing equipment 412 may all be implemented together on one or more devices. Processing equipment 412 may communicate with communication circuitry 402 and database 414 to retrieve and/or transmit information. For example, processing equipment 412 may retrieve credential information associated with a user in possession of a client device from database 414 before allowing a transaction to be made on the client device.

Payload generation circuitry 404 may be configured with any suitable software, hardwired instructions, or both to generate a payload. For example, payload generation circuitry 404 may be at least a portion of one or more integrated circuit processors. A payload is data which allows a client device to initiate communication (e.g., through API calls) with an aggregator system. A payload may be generated by payload generation circuitry 404, subsequently passed to encryption circuitry 406 to be encrypted, and the encrypted payload may be passed to a client device, such as client device 106 of FIG. 1. In some embodiments, a payload may be generated by combining correlation identification information, a timestamp value, and a nonce value. Correlation identification information may include, for example, merchant generated identification information which is associated with a particular client device transaction. In some embodiments, correlation identification information may be a user identification value (e.g. a user ID) associated with a user in possession of a client device. A timestamp value may include, for example the current date and time. In some embodiments, a timestamp value may be expressed in the format "yyyyMMddHHmmss", where "yyyy" represents the current year, "MM" represents the current month, "dd" represents the current day, "HH" represents the hours, "mm" represents the current minutes, and "ss" represents the current seconds. The timestamp value need not be expressed in the above described format, but may instead be expressed in any suitable format. In some embodiments, a nonce value may include, for example, a random value with a minimum length of 32 characters.

Encryption circuitry 406 may be configured with any suitable software, hardwired instructions, or both to encrypt, decrypt, or both information such as, for example, a payload, information to be stored in database 414, any other suitable information, or any combination thereof. For example, encryption module 406 may be at least a portion of one or more integrated circuit processors. Encrypting information may protect the information from being stolen, hacked, or otherwise leaked to a source which does not have permission to access the information. In some embodiments, information may be encrypted using an encryption key, such as a symmetric key, an asymmetric key, any other suitable encryption method, or any combination thereof. For example, an aggregator system may provision a merchant system with an encryption key, and the merchant system may use the encryption key to encrypt information. In some embodiments, the advanced encryption standard (AES), or any other suitable strong symmetric-key block cipher, should be used when information is encrypted by encryption circuitry 406. In some embodiments, information to be encrypted may include a payload generated by payload generation circuitry 404. Merchant system 400 may pass a payload encrypted by encryption circuitry 406 to a client device, and the encrypted payload may facilitate client-initiated interaction between a client device and an aggregator system. An encrypted payload may be unique for a client device, but not unique for each request made by the client device.

Request processing circuitry 408 may be configured with any suitable software, hardwired instructions, or both to process requests from other systems and devices, for example, carrier system 104 of FIG. 1, aggregator system 100 of FIG. 1, or client device 106 of FIG. 1. For example, request processing circuitry 408 may be at least a portion of one or more integrated circuit processors. Requests may include a request to output information (e.g., identification information or authentication information), a request to accept information, any other suitable request, or any combination thereof. In some embodiments, one or more requests may be received by communication circuitry 402 and passed from communication circuitry 402 to request processing circuitry 408. Request processing circuitry 408 may determine an appropriate response to each of the one or more requests, for example, processing information, generating information, analyzing information, communicating with another circuitry within processing equipment 412, transmitting data to database 414, receiving data from database 414, any other appropriate response, or any combination thereof. In some embodiments, request processing circuitry may process, respond to, or both, requests received from other circuitries within processing equipment 412.

Transaction processing circuitry 410 may be configured with any suitable software, hardwired instructions, or both to process a transaction made on a client device. For example, transaction processing circuitry 410 may be at least a portion of one or more integrated circuit processors. Processing a transaction may include, for example, submitting payment information, completing a sale, any other suitable process, or any combination thereof. A transaction may be a purchase transaction, a registration, any other suitable process, or any combination thereof. In some embodiments, transaction processing circuitry 410 may use data stored in database 414 to process a transaction. In other embodiments, transaction processing circuitry 410 may use data received from another system, such as an aggregator system, to process a transaction. For example, a client device may visit a website published by merchant system 400 to make a purchase transaction, and merchant system 400 may receive information from an aggregator system, such as aggregator system 100 of FIG. 1, to process the purchase transaction. In some embodiments, transaction processing circuitry 410 may prepopulate transaction data fields with information received from another system or device, or information received from database 414.

Figure 5:
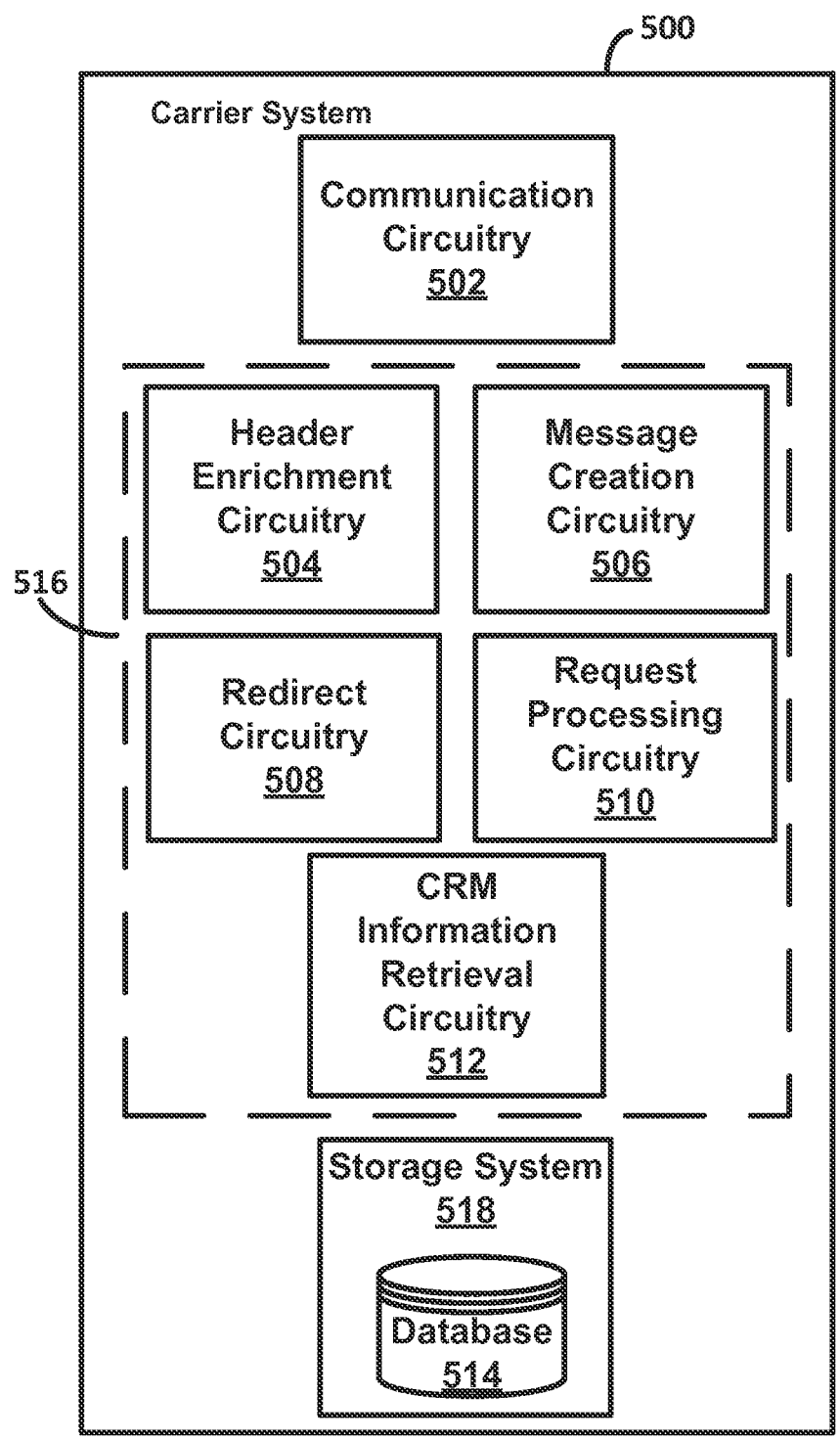
FIG. 5 is a block diagram of an illustrative carrier system in accordance with some embodiments of the present disclosure.

FIG. 5 is a block diagram of illustrative carrier system 500 in accordance with some embodiments of the present disclosure. Carrier system 500 may be any suitable carrier system, such as carrier system 208 of FIG. 2 or carrier system 104 of FIG. 1. In some embodiments, carrier system 500 may be implemented in a network environment, such as that of FIG. 1. Carrier system 500 may include any suitable software, hardware, or both configured to implement the features as described herein. For example, carrier system 500 may include server hardware and software. Carrier system 500 may include communication circuitry 502, storage system 518, and processing equipment 516.

Communication circuitry 502 may be configured with any suitable software, hardwired instructions, or both to communicate with database 514 and processing equipment 516, and may include inputs, outputs, any other mechanisms which facilitate communication with other systems and devices, or any combination thereof. An input or output is a relative communication channel that can be used to receive or send data, respectively. A communication channel may be established as, for example, an IP protocol-based communications session using any suitable network infrastructure, including the Internet, any proprietary LAN, WAN, any other suitable network infrastructure, or any combination thereof. Inputs and outputs can be implemented as one or more physical ports, a data storage device, any other suitable hardware interface, software interface, or any combination thereof. For example, carrier system 500 may include an aggregator input coupled to an aggregator system and configured to receive data from the aggregator system, an aggregator output coupled to the aggregator system and configured to output data to the aggregator system, a merchant input coupled to a merchant system and configured to receive data from the merchant system, a merchant output coupled to the merchant system and configured to output data to the merchant system, a client device input coupled to a client device and configured to receive data from the client device, a client device output coupled to the client device and configured to output data to the client device, any other suitable input or output, or any combination thereof. In the context of the present disclosure, it may be preferential for carrier system 500 to not include a merchant system input and a merchant system output. That is, carrier system 500 need not be able to communicate with a merchant system in preferred embodiments of the present invention. While different inputs and outputs are described, it will be understood that they need not be separate components and two or more of the inputs and/or outputs may, indeed be implemented as a single component that can be used to send or receive data relative to more than one destination or source, respectively. For example, communication circuitry 502 may include a transceiver, such as an Ethernet card, or any other suitable device or circuitry which facilitates communication with other systems and devices.

Storage system 518 may include any suitable hardware, software, or both for implementing an organized data storage system capable of storing one or more databases and information related to, for example, account data, rules, and CRM information associated with a user in possession of a client device. For example, storage system 518 may include database 514. In some embodiments, storage system 518 may store information which is not stored in database 514, and carrier system 500 may be configured to communicate such information to a trusted aggregator system, such as aggregator system 300.

Database 514 may include any suitable hardware, software, or both for implementing an organized data storage system capable of storing information related to, for example, account data and CRM information associated with a user in possession of a client device. In some embodiments, database 514 may store information in an encrypted form. For example, hashed information may be generated using a hash operation, and the hashed information may be stored in database 514.

Processing equipment 516 may be any suitable hardware, software, or both configured to process data received from other systems and devices (e.g., a client device, an aggregator system, or any other suitable system or device), process data to be output to other systems and devices (e.g., CRM information), and perform other tasks. In some embodiments, processing equipment 516 may include one or more circuitries for performing the functionality as described herein, such as header enrichment circuitry 504, message creation circuitry 506, redirect circuitry 508, request processing circuitry 510, CRM information retrieval circuitry 512, any other suitable processing equipment, or any combination thereof. The circuitries within processing equipment 516 may communicate with one another to implement the features as described herein. Additionally, the circuitries within processing equipment 516 may all be implemented together on one or more devices. Processing equipment 516 may be configured to communicate with communication circuitry 502 and database 514 to retrieve and/or transmit information related to user account data, CRM information, any other information, or any combination thereof.

Header enrichment circuitry 504 may be configured with any suitable software, hardwired instructions, or both to insert one or more headers (e.g., a hypertext transfer protocol (http) header) into a request or response, such as an http redirect request or response. For example, header enrichment circuitry 504 may be at least a portion of one or more integrated circuit processors. An http redirect request and/or response may include a message header, and an http header may be inserted into the message header. In some embodiments, http headers inserted into an http redirect request may include client device identification information, and a system receiving an http response where http headers were inserted in a corresponding http request may extract the client device identification information for use or storage (e.g., for use in identifying a client device). For example, a client device on a carrier network operated by carrier system 500 may be redirected from a website published by a merchant system to a website published by an aggregator system using an http redirect request processed by carrier system 500, and header enrichment circuitry 504 may insert one or more http headers in the http redirect request.

Message creation circuitry 506 may be configured with any suitable software, hardwired instructions, or both to create a message such as, for example, a short message service (SMS) message, a silent SMS message, any other suitable type of message, or any combination thereof. For example, message creation circuitry 506 may be at least a portion of one or more integrated circuit processors. In some embodiments, message creation circuitry 506 may be configured to generate an SMS message in response to a request from another system or device, such as aggregator system 100 of FIG. 1 or client device 106 of FIG. 1. For example, carrier system 500 may receive a request to generate an SMS message and send it to a client device, and message creation circuitry may create the SMS message and may specify that the message should be sent to the mobile phone number of the client device.

Redirect circuitry 508 may be configured with any suitable software, hardwired instructions, or both to redirect, for example, a request, information, or both from one system to another system. For example, redirect circuitry 508 may be at least a portion of one or more integrated circuit processors. In some embodiments, redirect circuitry 508 may be configured to redirect an SMS message from one system or device to another system or device. In other embodiments, redirect circuitry 508 may be configured to perform an http redirect from a website associated with one system to a website associated with another system. Redirect circuitry 508 may additionally be configured to perform any other suitable redirect from one system to another system. In some embodiments, redirect circuitry 508 may receive instructions which cause the redirect to be performed. In some embodiments, redirect circuitry 508 may receive such instructions from request processing circuitry 410.

Request processing circuitry 510 may be configured with any suitable software, hardwired instructions, or both to process requests from other systems and devices, for example, aggregator system 100 of FIG. 1 or client device 106 of FIG. 1. For example, request processing circuitry 510 may be at least a portion of one or more integrated circuit processors. Requests may include a request for information, such as user account information or CRM information, any other suitable request, or any combination thereof. One or more requests may be received by communication circuitry 502 and passed from communication circuitry 502 to request processing circuitry 510. Request processing circuitry 510 may determine a suitable response to each of the one or more requests, such as processing information, communicating with another circuitry within processing equipment 516, transmitting data to database 514, receiving data from database 514, any other appropriate response, or any combination thereof. In some embodiments, request processing circuitry 510 may process, respond, or both to requests received from other circuitries within processing equipment 516.

CRM information retrieval circuitry 512 may be configured with any suitable software, hardwired instructions, or both to retrieve CRM information associated with a client device. For example, CRM information retrieval circuitry 512 may be at least a portion of one or more integrated circuit processors. In some embodiments, CRM information may include information related to an account associated with a user in possession of a client device (e.g., payment information, name, address, social security number, etc.), or any other suitable information which may be obtained through interactions between carrier system 500 and a client device. It should be understood that protected information associated with a user, such as a social security number, may only be accessed by trusted systems and devices to which permission has been granted by the user. CRM information retrieval circuitry 512 may be configured to retrieve appropriate CRM information from database 514. In some embodiments, CRM information retrieval circuitry 512 may be configured to retrieve appropriate CRM information in response to a request received from request processing circuitry 510. For example, an aggregator system, such as aggregator system 100 of FIG. 1, may request CRM information associated with an identified client device from carrier system 500, and CRM information retrieval circuitry 512 may retrieve the requested CRM information and provide it to communication circuitry 502 to be output to the aggregator system.

Figure 6:
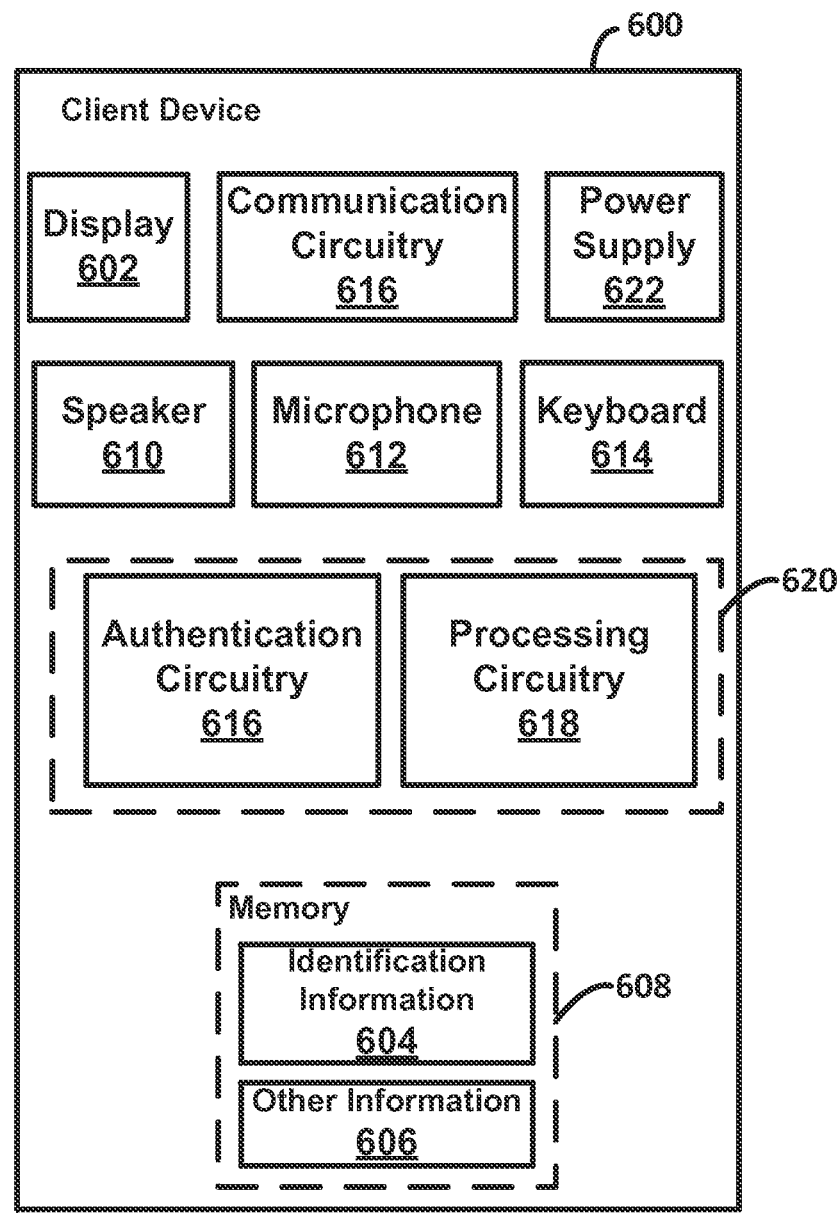
FIG. 6 is a block diagram of an illustrative client device in accordance with some embodiments of the present disclosure.

FIG. 6 is a block diagram of illustrative client device 600 in accordance with some embodiments of the present disclosure. Client device 600 may be any suitable client device, such as client device 206 of FIG. 2 or client device 106 of FIG. 1. In some embodiments client device 600 may be implemented in a network environment, such as that of FIG. 1. Client device 600 may include any suitable software, hardware, or both configured to implement the features as described herein. Client device 600 may include display 602, communication circuitry 616, power supply 622, speaker 610, microphone 612, keyboard 614, memory 608, and processing equipment 620.

Display 602 may be configured to display any information stored on or received by client device 600 in any suitable format. Information displayed may include, for example, information requested by a user of client device 600, information related to client device 600, information related to a transaction, information related to an mobile application, information received from another system or device, information to be sent to another system or device, an SMS message, any other suitable information, or any combination thereof. Display 602 may be, for example, a flat panel display such as a liquid crystal display, plasma display, any other suitable display, or any combination thereof.

Power supply 622 may be configured to supply power to client device 600. Power supply 622 may be any suitable internal or external power source such as, for example, a battery.

Speaker 610 may be configured to provide audible sound. The audible sound may be related to a phone call on client device 600, an application running on client device 600, an alarm set on client device 600, a transaction, any other suitable process or application, or any combination thereof.

Microphone 612 may be configured to receive user input such as, for example, audible user input. The inputs received by microphone 612 may include information related to, for example, a phone call on client device 600, a user in possession of client device 600, a transaction, any other suitable information, or any combination thereof.

Keyboard 614 may be configured to receive user input such as, for example, text input. The inputs received by keyboard 614 may be information related to, for example, a message stored on or created on client device 600, a user in possession of client device 600, a transaction, any other suitable information, or any combination thereof.

Communication circuitry 616 may include inputs, outputs, any other mechanisms which facilitate communication with other systems and devices, or any combination thereof. Communication circuitry 616 may be configured with any suitable software, hardwired instructions, or both. An input or output is a relative communication channel that can be used to receive or send data, respectively. A communication channel may be established as, for example, an IP protocol-based communications session using any suitable network infrastructure, including the Internet, any proprietary LAN, WAN, any other suitable network infrastructure, or any combination thereof. Inputs and outputs can be implemented as one or more physical ports, a data storage device, any other suitable hardware interface, software interface, or any combination thereof. For example, client device 600 may include a carrier input coupled to a carrier system and configured to receive data from the carrier system, a carrier output coupled to the carrier system and configured to output data to the carrier system, a merchant input coupled to a merchant system and configured to receive data from the merchant system, a merchant output coupled to the merchant system and configured to output data to the merchant system, an aggregator input coupled to an aggregator system and configured to receive data from the aggregator system, an aggregator output coupled to the aggregator system and configured to output data to the aggregator system, any other suitable input or output, or any combination thereof. While different inputs and outputs are described, it will be understood that they need not be separate components and two or more of the inputs and/or outputs may, indeed be implemented as a single component that can be used to send or receive data relative to more than one destination or source, respectively. For example, communication circuitry 616 may include a transceiver, such as an Ethernet card, or any other suitable device or circuitry which facilitates communication with other systems and devices. Communication circuitry 616 may be configured to communicate with memory 608, processing equipment 620, speaker 610, microphone 612, keyboard 614, power supply 622, and display 602.

Memory 608 may be one or more suitable memory devices such as, for example, a hard disk drive, flash memory, random access memory (RAM), an optical disk, any other suitable memory device, or any combination thereof. Memory 608 may include identification information 604 and other information 606. Identification information 604 may include any suitable identification information related to client device 600. For example, identification information 604 may include information identifying hardware or software of client device 600, information identifying a mobile phone number associated with client device 600, information identifying a device model of client device 600, information identifying a user in possession of client device 600, information identifying a carrier system associated with client device 600, any other suitable identification information, or any combination thereof. Other information 606 may include any information stored in memory 608 other than identification information 604. For example, other information 606 may store information related to applications, messaging, photos and videos, transactions, merchants, networks, capacity and storage, any other suitable information, or any combination thereof.

Processing equipment 620 may be any suitable hardware, software, or both configured to process data received from other systems and devices (e.g., a merchant system, a carrier system, an aggregator system, or any other suitable system or device), process data to be output to other systems and devices, process data related to mobile applications, and perform other tasks. In some embodiments, processing equipment 620 may include one or more circuitries for performing the functionality as described herein, such as authentication circuitry 616, processing circuitry 618, any other suitable processing equipment, or any combination thereof. The circuitries within processing equipment 620 may communicate with one another to implement the features as described herein. Additionally, the circuitries within processing equipment 620 may all be implemented together on one or more devices. Processing equipment 620 may be configured to communicate with communication circuitry 616, memory 608, speaker 610, microphone 612, keyboard 614, power supply 622, and display 602.

Authentication circuitry 616 may be configured with any suitable software, hardwired instructions, or both to authenticate client device 600. For example, authentication circuitry 616 may be at least a portion of one or more integrated circuit processors. In some embodiments, authenticating client device 600 may include authenticating a user in possession of client device 600. In some embodiments, authentication circuitry 616 may communicate with a system, such as a merchant system or an aggregator system, via communication circuitry 616, in order to authenticate client device 600. Authenticating client device 600 may include prompting a user in possession of client device 600 to input information. Information may be input via display 602, keyboard 614, microphone 612, any other suitable user input, or any combination thereof. Information may include, for example, uniquely identifying information related to the user in possession of client device 600. In some embodiments, authentication circuitry 616 may communicate with memory 608 to authenticate client device 600. For example, memory 608 may store information received from an aggregator system, such as aggregator system 100 of FIG. 1, and subsequent to prompting a user in possession of client device 600 for information, authentication circuitry 616 may compare the entered information to that stored in memory 608.

Processing circuitry 618 may be configured with any suitable software, hardwired instructions, or both to implement any features other than authentication. For example, processing circuitry 618 may be at least a portion of one or more integrated circuit processors. For example, processing circuitry 618 may be configured to run applications, to compute information, to process instructions, to carry out functions related to client device operation, to carry out any other suitable operation or implementation, or any combination thereof.

Figure 11:
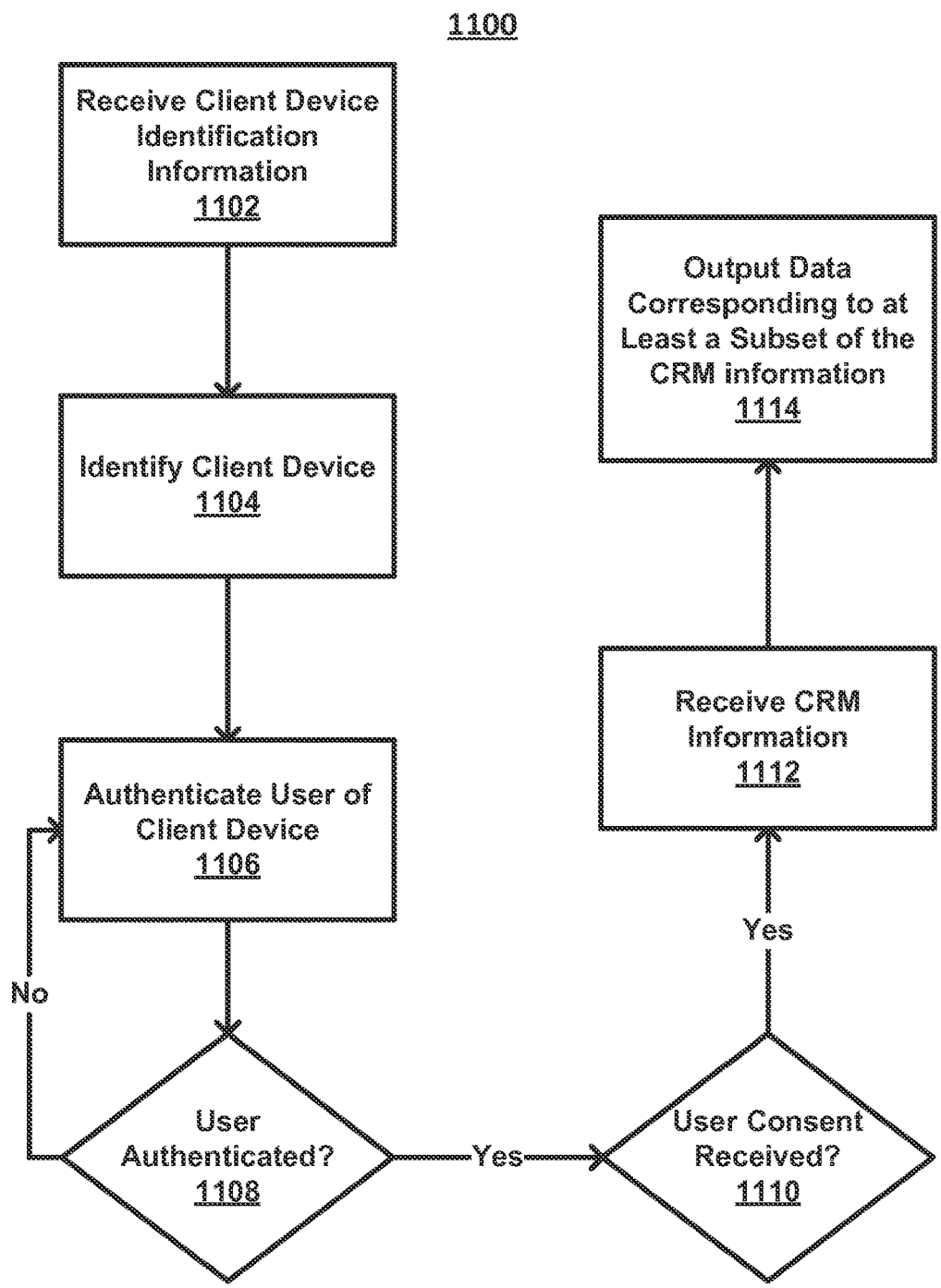
FIG. 11 is a flow diagram including illustrative steps for outputting data corresponding to at least a subset of CRM information in accordance with some embodiments of the present disclosure.

FIG. 11 is a flow diagram including illustrative steps for outputting data corresponding to at least a subset of CRM information in accordance with some embodiments of the present disclosure. In some embodiments, the steps of FIG. 11 may be performed by an aggregator system, such as aggregator system 100 of FIG. 1, aggregator system 202 of FIG. 2, or aggregator system 300 of FIG. 3.

At step 1102, client device identification information is received by an aggregator system. In some embodiments, client device identification information (e.g., information identifying a mobile phone number associated with the client device, information identifying a carrier system associated with the client device, information identifying software or hardware of the client device, information identifying a user in possession of the client device, any other suitable identification information, or any combination thereof) may be received from a carrier system. In other embodiments, client device identification information may be received from a merchant system. In some embodiments, an input may be used to receive the client device identification information. For example, communication circuitry 302 of FIG. 3 may be used to receive the client device identification information.

At step 1104, a client device may be identified by the aggregator system based on the client device identification information received at step 1102. The client device may be identified by processing equipment, such as client device identification circuitry 306 of FIG. 3. In some embodiments, a client device may be identified using an MO identification technique, an MT identification technique, a header enrichment identification technique, any other suitable identification technique, or any combination thereof.

Figure 7:
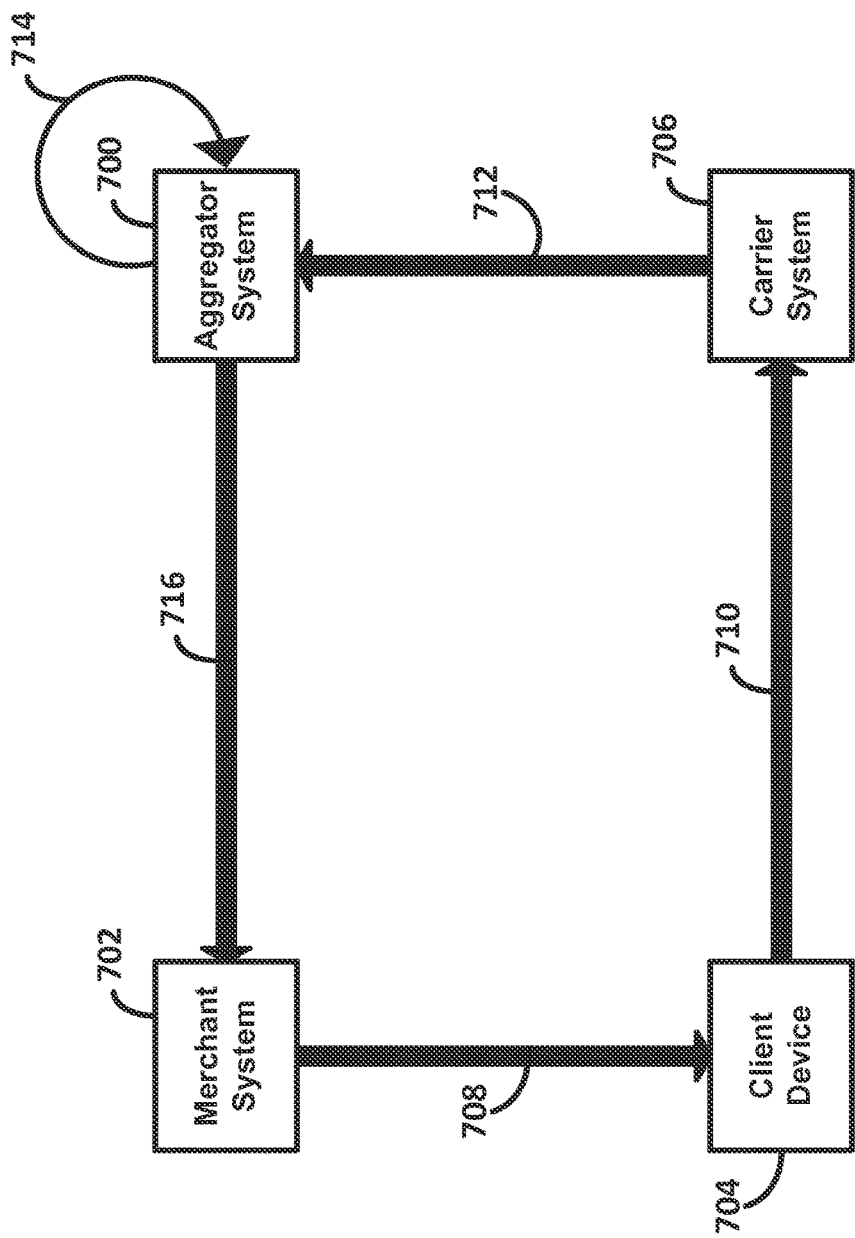
FIG. 7 is a block diagram showing an illustrative process flow in a system that implements a mobile originated client device identification technique in accordance with some embodiments of the present disclosure.

FIG. 7 is a block diagram showing an illustrative process flow in a system that implements a MO message client device identification technique in accordance with some embodiments of the present disclosure. In the MO message identification technique, merchant system 702 may request the user of client device 704 to send an SMS message to a specified short code via communication path 708. In response to the request received from merchant system 702, the user of client device 704 may send an SMS message to the specified short code via communication path 710. Carrier system 706 may route the SMS message sent by client device 704, along with client device identification information including the user's mobile phone number, to aggregator system 700. Aggregator system 700 may receive the SMS message and client device identification information routed by carrier system 706, and subsequently may identify the client device at 714. Identifying the client device may include storing the received client device identification information, including the user's mobile phone number, in a database of aggregator system 700, such as database 304. Merchant system 702 may be any suitable merchant system, such as merchant system 400 of FIG. 4, merchant system 204 of FIG. 2, or merchant system 102 of FIG. 1. Client device 704 may be any suitable client device, such as client device 600 of FIG. 6, client device 206 of FIG. 2, or client device 106 of FIG. 1. Carrier system 706 may be any suitable carrier system, such as carrier system 500 of FIG. 5, carrier system 208 of FIG. 2, or carrier system 104 of FIG. 1. Aggregator system 700 may be any suitable aggregator system, such as aggregator system 300 of FIG. 3, aggregator system 202 of FIG. 2, or aggregator system 100 of FIG. 1.

Figure 8:
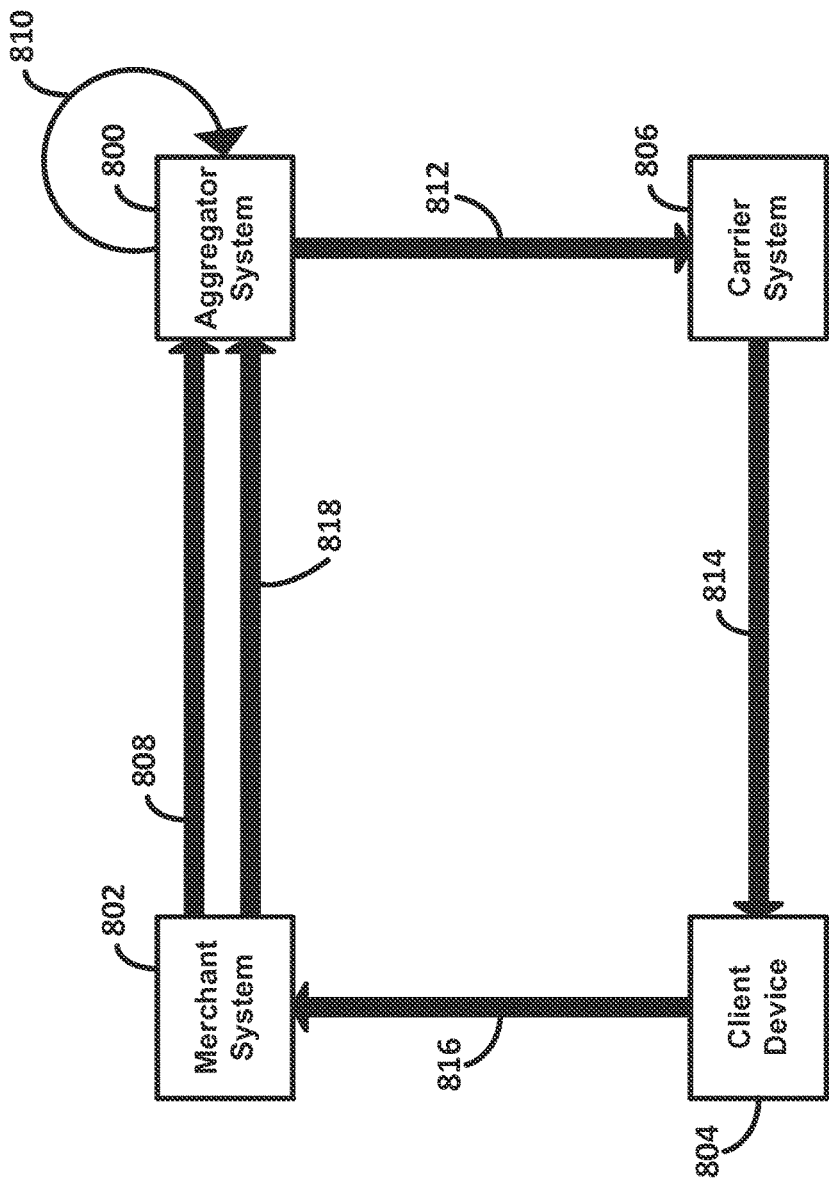
FIG. 8 is a block diagram showing an illustrative process flow in a system that implements a mobile terminated client device identification technique in accordance with some embodiments of the present disclosure.

In other embodiments, a client device may be identified at step 1104 using an MT message identification technique, as shown in FIG. 8. In the MT message client device identification technique shown in FIG. 8, merchant system 802 provides aggregator system 800 with the mobile phone number of the user of client device 804, and requests aggregator system 800 to send a unique PIN to client device 804. Merchant system 802 may provide the mobile phone number and make the request to aggregator system 800 via communication path 808. In response to the request from merchant system 802, aggregator system 800 may generate a unique PIN at 810. Aggregator system 800 sends an SMS message identifying the unique PIN which is routed to carrier system 806 via communication path 812, and routed from carrier system 806 to client device 804 via communication path 814. Subsequent to receiving the SMS message with unique PIN, client device 804 communicates the unique PIN to merchant system 802 via communication path 816. Merchant system 802 then requests aggregator system 800 to validate the unique PIN communicated by client device 804 via communication path 818. Aggregator system 800 may validate the unique PIN by comparing the unique PIN communicated by client device 804 against the unique PIN generated at step 810. If aggregator system 800 determines that the unique PIN entered by client device 804 matches the unique PIN generated at step 810, then identification is successful. Merchant system 802 may be any suitable merchant system, such as merchant system 400 of FIG. 4, merchant system 204 of FIG. 2, or merchant system 102 of FIG. 1. Client device 804 may be any suitable client device, such as client device 600 of FIG. 6, client device 206 of FIG. 2, or client device 106 of FIG. 1. Carrier system 806 may be any suitable carrier system, such as carrier system 500 of FIG. 5, carrier system 208 of FIG. 2, or carrier system 104 of FIG. 1. Aggregator system 800 may be any suitable aggregator system, such as aggregator system 300 of FIG. 3, aggregator system 202 of FIG. 2, or aggregator system 100 of FIG. 1.

Figure 9:
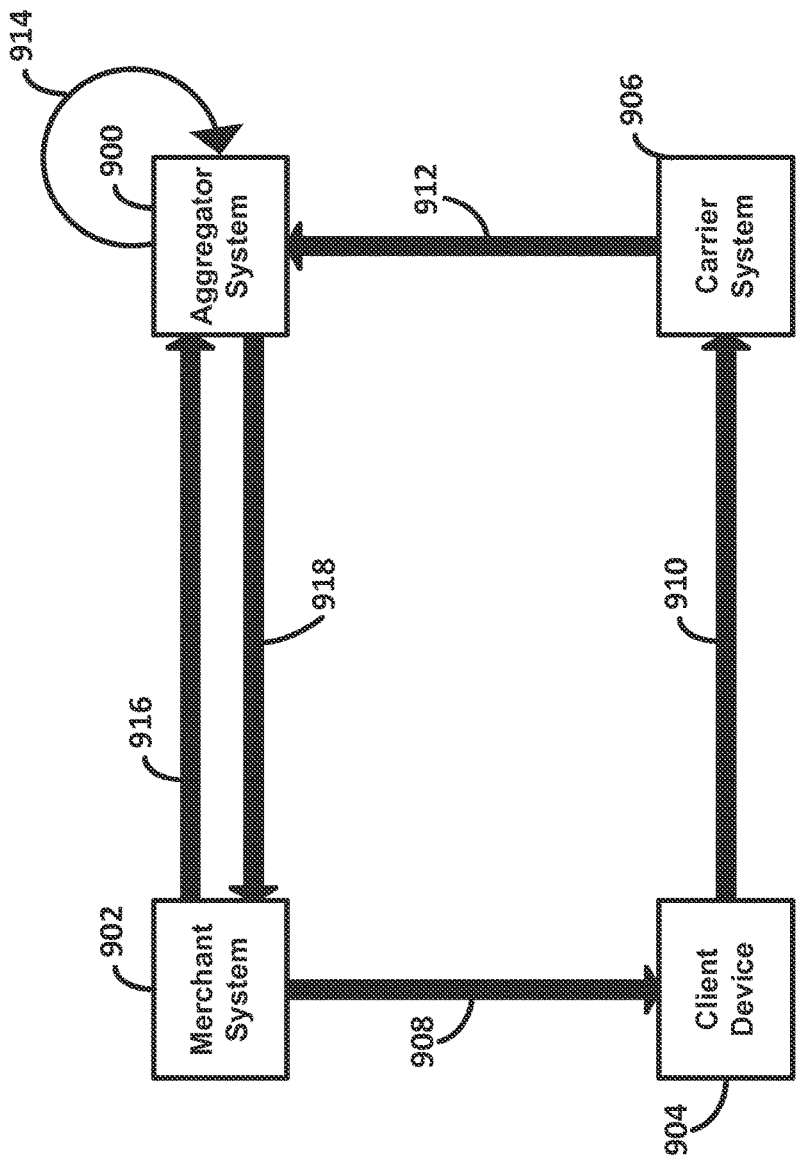
FIG. 9 is a block diagram showing an illustrative process flow in a system that implements a header enrichment client device identification technique in accordance with some embodiments of the present disclosure.

In other embodiments, a client device may be identified at step 1104 using a header enrichment identification technique, as shown in FIG. 9. In the header enrichment client device identification technique shown in FIG. 9, client device 904 communicates with merchant system 902 and carrier system 906 via a carrier network. Upon initiating communication with merchant system 902, client device 904 is redirected to aggregator system 900 via carrier system 906. Client device 904 may initiate communication with merchant system 902, for example, by accessing a webpage associated with merchant system 902. Merchant system 902 sends the redirect request via communication path 908, and the client device is redirected by carrier system 906 to aggregator system 900 via communication paths 910 and 912. Carrier system 906 inserts headers in the redirect request, and aggregator system 900 identifies client device 904 at 914 based on client device identification information extracted from the headers. In some embodiments, aggregator system 900 may need to decrypt information in the headers before client device 904 can be identified. In other embodiments, aggregator system 900 may need to request additional information from carrier system 906 before client device 904 can be identified. Merchant system 902 may subsequently request identification information associated client device 904 from aggregator system 900 via communication path 916. In response to the request received from merchant system 902 via communication path 916, aggregator system 900 may redirect client device 904 back to merchant system 902 and return the requested identification information via communication path 918. Merchant system 902 may be any suitable merchant system, such as merchant system 400 of FIG. 4, merchant system 204 of FIG. 2, or merchant system 102 of FIG. 1. Client device 904 may be any suitable client device such as client device 600 of FIG. 6, client device 206 of FIG. 2, or client device 106 of FIG. 1. Carrier system 906 may be any suitable carrier system such as carrier system 500 of FIG. 5, carrier system 208 of FIG. 2, or carrier system 104 of FIG. 1. Aggregator system 900 may be any suitable aggregator system such as aggregator system 300 of FIG. 3, aggregator system 202 of FIG. 2, or aggregator system 100 of FIG. 1.

At step 1106 of FIG. 11, a user in possession of the identified client device may be authenticated by the aggregator system. In some embodiments, processing equipment such as authentication circuitry 308 may be used to authenticate the client device at step 1106. In some embodiments, authenticating a user may include verifying the identity of the user. Verifying a user may include, for example, requesting uniquely identifying information from the user, requesting the user to confirm a unique PIN sent to the user's client device, requesting the user to send a specific MO message, requesting the user to send a specific silent MO message, any other suitable verification technique or request, or any combination thereof. Authenticating a user may additionally include comparing any information provided by the user in possession of the client device to any information stored in a database of the aggregator system, such as database 304, determining that the client device has not been identified as being stolen, determining that the client device has not been associated with a fraud event, any other suitable process or analysis, or any combination thereof.

At step 1108, the aggregator system may determine whether or not the user in possession of the client device has been authenticated. If at step 1108 the aggregator system determines that the user of the client device has not been authenticated, step 1106 will be repeated and the aggregator system will attempt to authenticate the user in possession of the client device again. In some embodiments, authentication may only be attempted a limited number of times, for example, three times. If at step 1108 the aggregator system determines that the user in possession of the client device has been authenticated, the aggregator system may proceed to step 1110.

At step 1110, the aggregator system may determine whether or not user consent has been received. User consent may be provided by the user in possession of the client device, and may be requested by the aggregator system or a merchant system. User consent may indicate permission for the aggregator system to retrieve protected consumer and payment information, such as CRM information. For example, the aggregator system may send the client device a message requesting permission to retrieve protected information (e.g., CRM information), and in response the user in possession of the client device may reply with or select an indication which grants or denies permission. User consent may be requested and/or received by the aggregator system using inputs and/or outputs, such as communication circuitry 302 of FIG. 3. If at step 1110 the aggregator system determines that user consent has been received, the aggregator system may proceed to step 1112.

At step 1112, the aggregator system may receive CRM information associated with the identified client device. In some embodiments, the CRM information may be associated with a user in possession of the client device, and may include information such as payment information, registration information, any other suitable information, protected or not, or any combination thereof. The CRM information may be received from a carrier system, such as carrier system 104 of FIG. 1, and may be based on transactions between the carrier system and the user of the client device. The CRM information need not be received from a carrier system, and may be received from any other suitable source such as financial institutions, utility companies, government organizations, universities, schools, any other suitable sources, or any combination thereof. The CRM information may be received using an input, such as, for example, communication circuitry 302 of FIG. 3.

At step 1114, the aggregator system may output data corresponding to at least a subset of the CRM information. Data corresponding to at least a subset of the CRM information may be output using, for example, communication circuitry 302 of FIG. 3. In some embodiments, data corresponding to at least a subset of the CRM information may include a user's first and last name, credit card or bank account information, address, and email information. In some embodiments, the data may be output to a client device for use in a transaction. In other embodiments, the data may be output to a merchant for use in a transaction. The client device or a merchant system may be configured to pre-populate data fields based on the CRM information, as shown in FIG. 12 and FIG. 13.

Figure 12:
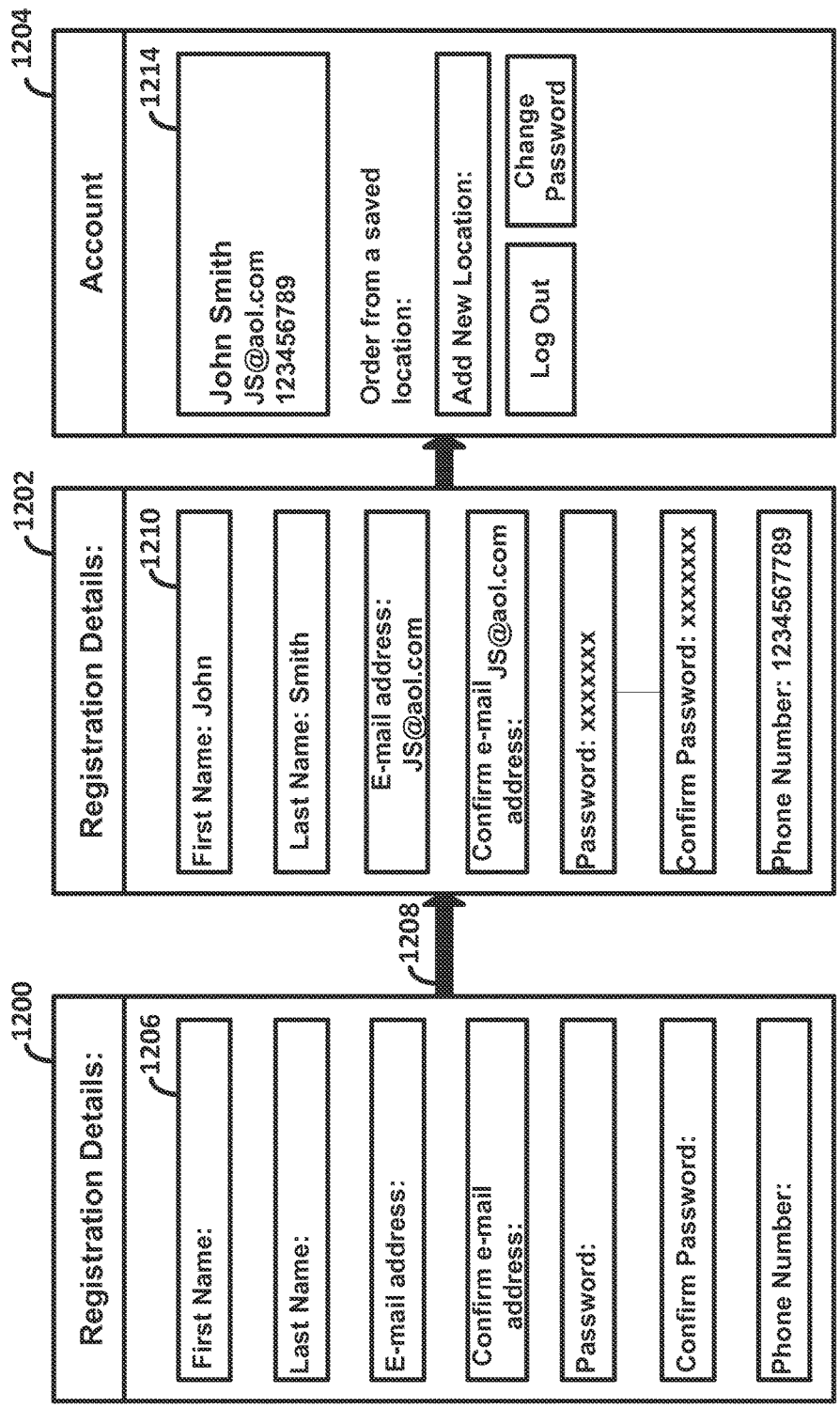
FIG. 12 shows a sequence of illustrative displays in which data fields are pre-populated in accordance with some embodiments of the present disclosure.

FIG. 12 shows a sequence of illustrative displays in which data fields are pre-populated in accordance with some embodiments of the present disclosure. Display 1200 shows blank registration data fields 1206 for a registration being made on a client device, such as client device 106 of FIG. 1. The registration may be, for example, a registration for a website published by a merchant, a club, an organization, a financial institution, any other suitable entity requiring registration, or any combination thereof. Subsequent to receiving data from an aggregator system, such as data corresponding to at least a subset of CRM information associated with the client device, the client device may pre-populate the data fields as shown in display 1202. Transitional arrow 1208 may represent the client device pre-populating the data fields 1206. A client device may re-populate fields using processing equipment, such as processing circuitry 618 of FIG. 6. Display 1202 illustrates registration data fields 1210, which are completed with pre-populated information associated with the user in possession of the client device. Display 1204 illustrates a confirmation screen on which the user may confirm the accuracy of the information 1214 which was used to pre-populate data fields 1206 on the client device. Displays 1200, 1202, and 1204 all may be display screens of a client device, such as client device 106 of FIG. 1, client device 206 of FIG. 2, or client device 600 of FIG. 6.

Figure 13:
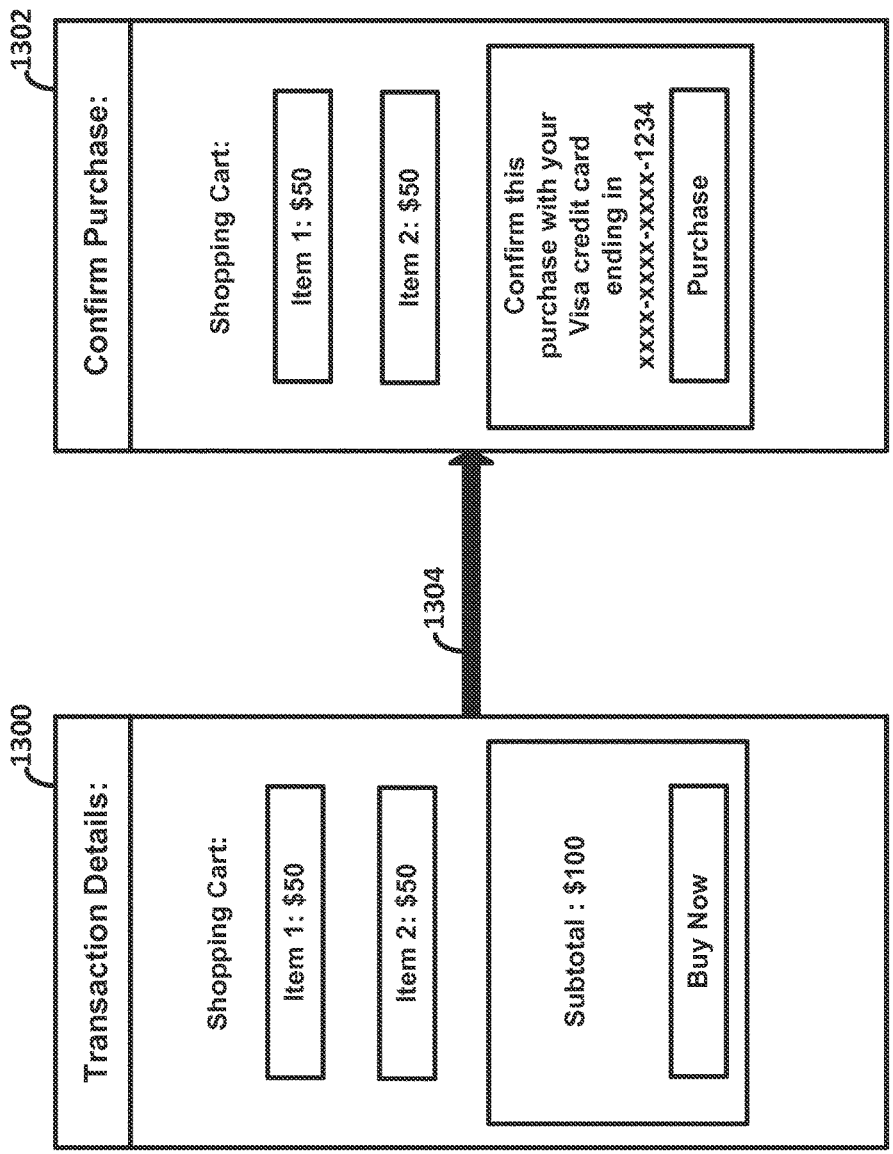
FIG. 13 shows another sequence of illustrative displays in which data fields are pre-populated in accordance with some embodiments of the present disclosure.

FIG. 13 shows another sequence of illustrative displays in which data fields are pre-populated in accordance with some embodiments of the present disclosure. Display 1300 illustrates transaction details, including purchase information, for a transaction being made on a client device, such as client device 106 of FIG. 1. The transaction may be, for example, a transaction for a sale of goods or services on a website published by a merchant system, a transaction to pay a bill, any other suitable transaction requiring payment information, or any combination thereof. Subsequent to receiving data corresponding to at least a subset of CRM information associated with the user in possession of the client device (e.g., from an aggregator system or another suitable system), the client device may pre-populate data fields for the transaction with information, including payment information, at 1304. Display 1302 illustrates a confirmation screen on which the user of the client device may confirm the information, including payment information, which was used to pre-populate the transaction data fields at 1304. Displays 1300 and 1302 may be display screens of a client device, such as client device 106 of FIG. 1, client device 206 of FIG. 2, or client device 600 of FIG. 6.

Figure 10:
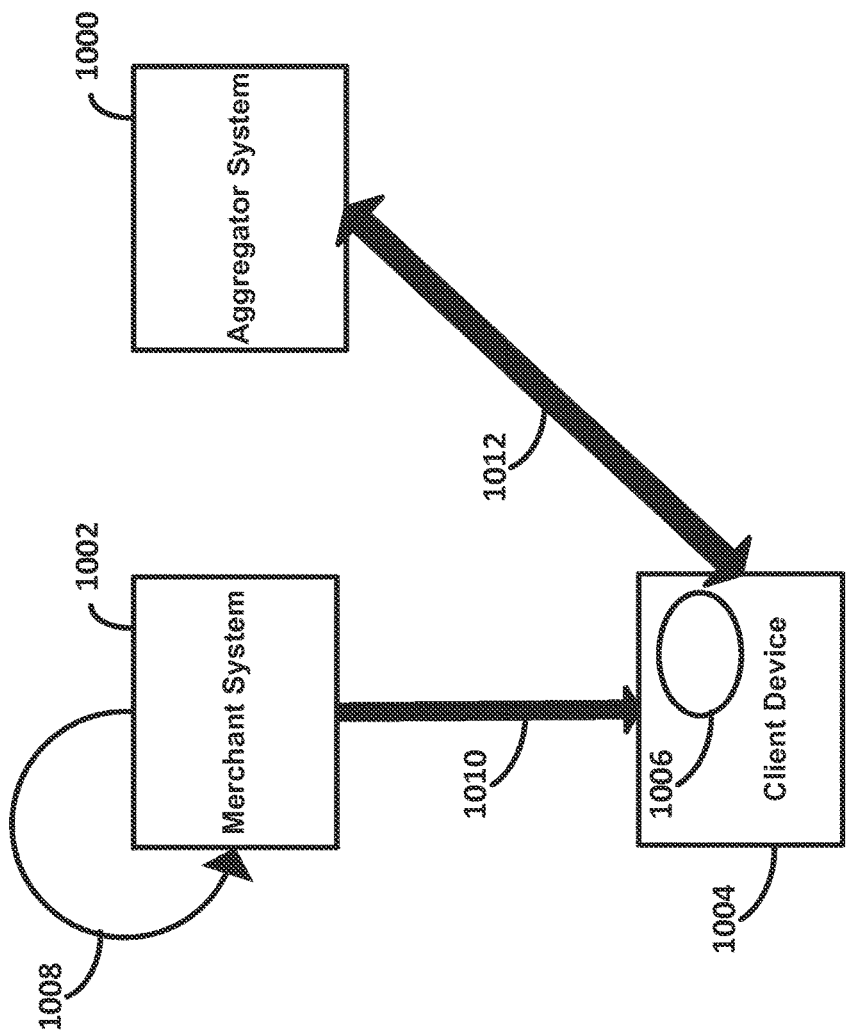
FIG. 10 shows an illustrative client-initiated interaction between a client device and an aggregator system in accordance with some embodiments of the present disclosure.

FIG. 10 shows an illustrative client-initiated interaction between a client device and an aggregator system in accordance with some embodiments of the present disclosure. In some embodiments, merchant system 1002 may provide client device 1004 with one or more JavaScript imports 1006 and an encrypted payload, such that client device 1004 may directly communicate with aggregator system 1000. JavaScript imports 1006 provided by merchant system 1002 may include a JQuery JavaScript import, an aggregator JavaScript API, any other suitable JavaScript imports, or any combination thereof. An encrypted payload may be generated by merchant system 1002 at 1008 using processing equipment such as, for example, payload generation circuitry 404 of FIG. 4 and encryption circuitry 406 of FIG. 4. Merchant system 1002 may pass the encrypted payload to client device 1004 via communication path 1010. In some embodiments, client device 1004 may perform a transaction by initiating an interaction with aggregator system 1000 using JavaScript imports 1006 and via communication path 1012.

In some embodiments, client device 1004 may make an identification API call to aggregate system 1000 using JavaScript imports 1006. An identification API call made by client device 1004 may include a request object, a success handler, an error handler, any other suitable parameter, or any combination thereof. A request object provided by client device 1004 may include a method name, hashed merchant identification information, the encrypted payload, any additional method specific parameters, or any combination thereof. A method name may specify, for example, an identification method, a method to retrieve information related to a user of client device 1004, any other suitable method, or any combination thereof. Hashed merchant identification information may be provided to client device 1004 by merchant system 1002. Merchant system 1002 may generate hashed merchant identification information by performing a hash operation on merchant identification information provided by aggregator system 1000. A success handler, when activated, may allow the transaction being performed on client device 1004 to continue. An error handler, when activated, may cause the transaction being performed on client device 1004 to halt. A successful identification call may identify the user of client device 1004 with aggregate system 1000, and may return information related to the carrier system associated with client device 1004 to be used on subsequent API calls via communication path 1012.

In some embodiments, client device 1004 may make an API call requesting information to aggregate system 1000 using JavaScript imports 1006. Requested information may include, for example, CRM information, or any other information including protected information. An API call requesting information made by client device 1004 may include a request object, a success handler, an error handler, and pre-populating parameter. The request object, success handler, and error handler for an API call requesting information are the same as the request object, success handler, and error handler for an identification call as described above. A pre-populating parameter may be have a value of true or false, and may indicate whether client device 1004 should pre-populate data fields in the transaction being performed on client device 1004 upon receiving the requested information. A successful request for information call may return the requested information from aggregator system 1000 to client device 1004 along communication path 1012. In some embodiments, client device 1004 may request information to complete a transaction, and may be configured to pre-populate data fields of the transaction with information returned by aggregator system 1000. It should be understood that client device 1004 may make various other API calls to aggregator system 1000, and is not limited to making identification calls and request for information calls. Merchant system 1002 may be any suitable merchant system, such as merchant system 400 of FIG. 4, merchant system 204 of FIG. 2, or merchant system 102 of FIG. 1. Aggregator system 1000 may be any suitable aggregator system, such as aggregator system 300 of FIG. 3, aggregator system 202 of FIG. 2 or aggregator system 100 of FIG. 1.

Figure 14:
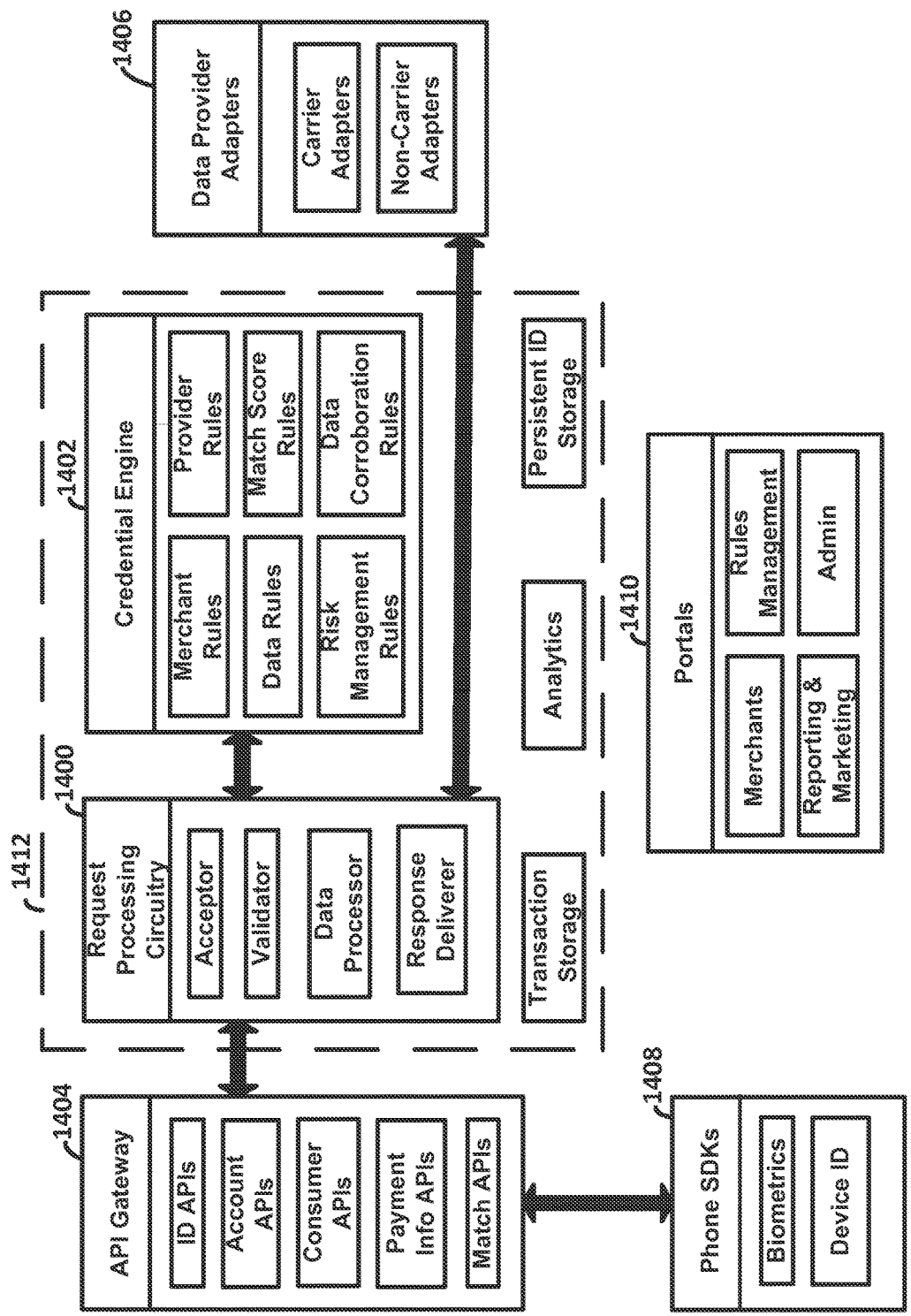
FIG. 14 is a block diagram showing detailed components of an illustrative aggregator system in accordance with some embodiments of the present disclosure.

FIG. 14 is a block diagram showing detailed components of illustrative aggregator system 1412 in accordance with some embodiments of the present disclosure. The aggregator system 1412 may include request processing circuitry 1400, credential engine 1402, transaction storage, analytics, persistent identification storage, any other suitable processing circuitries, storage components, or communication components, or any combination thereof. Aggregator system 1412 may be any suitable aggregator system, such as aggregator system 300 of FIG. 3, aggregator system 202 of FIG. 2 or aggregator system 100 of FIG. 1.

Credential engine 1402 may be credential engine 310 of FIG. 3, and may be configured to determine credentials for revoking authentication of an identified client device. In some embodiments, an authenticated client device may receive credentials, and when authentication is revoked the credentials may be invalidated. Credential engine 1402 may include merchant rules, provider rules, data rules, match score rules, risk management rules, data corroboration rules, any other suitable rules, or any combination thereof. Rules may define an event or condition, which when matched may cause authentication to be revoked. In some embodiments, credential engine 1402 may determine credentials based at least in part on these rules. Credential engine 1402 may communicate with request processing circuitry 1400. For example, request processing circuitry 1402 may pass rules to credential engine 1402.

Request processing circuitry 1400 may be request processing circuitry 314 of FIG. 3, and may be configured with any suitable software, hardwired instructions, or both to process requests from other systems and devices, such as client device 106 of FIG. 1 or carrier system 104 of FIG. 1. For example, request processing circuitry 1400 may be at least a portion of one or more integrated circuit processors. Request processing circuitry 1400 may include an acceptor, a validator, a data processor, a response deliverer, any other suitable component or processor, or any combination thereof. The acceptor may accept a request, such as a request to consider a rule, and the validator, the data processor, the response deliverer, or any combination thereof, may be used to determine that the rule should be passed to credential engine 1402. Request processing circuitry 1400 may communicate with data provider adapters 1406 and API gateway 1404, for example, to accept or respond to a request.

Data provider adapters 1406 may be configured to enable communication between data providers and aggregator system 1412. Data provider adapters may include carrier adapters configured to enable communication between carrier systems and aggregator system 1412, and non-carrier adapters configured to enable communication between non-carrier systems and aggregator system 1412. Non-carrier systems may include financial institutions, utility companies, government organizations, universities, schools, any other suitable systems, or any combination thereof.

API gateway 1404 may enable interaction and communication between aggregator system 1412 and other systems or devices, such as client device 106 of FIG. 1. For example, a client device may make an API call directly to aggregator system 1412, such as an identification call or request for information call, and API gateway 1404 may enable such an interaction. API gateway 1404 may include identification APIs, account APIs, consumer APIs, payment info APIs, match APIs, any other suitable APIs, or any combination thereof. API gateway 1404 may communicate with client device software development kits (SDKs), such as mobile phone SDKs 1408. Phone SDKs 1408 may allow a client device, such as a mobile phone, to make API calls to aggregator system 1412 via API gateway 1404. Phone SDKs 1408 may include biometrics, device identification information, any other suitable information, or any combination thereof.

Portals 1410 may include systems which are external to aggregator system 1412, such as merchant systems, rules management systems, administrative systems, reporting and marketing systems, any other suitable systems, or any combination thereof. In some embodiments, portals 1410 may communicate with aggregator system 1412, a client device, such as client device 106 of FIG. 1, any other suitable system or device, or any combination thereof.

It will be understood that the steps above are exemplary and that in some implementations, steps may be added, removed, omitted, repeated, reordered, modified in any other suitable way, or any combination thereof.

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A system comprising:
an aggregator system comprising:
  carrier input circuitry coupled to a carrier system and configured to receive customer relationship management (CRM) information and client device identification information from the carrier system;
  client device output circuitry coupled to a client device and configured to provide data to the client device corresponding to at least a subset of the CRM information, wherein the client device is configured to:
    receive a content page from a merchant system;
    receive a selectable software import from the merchant system allowing the client device to directly communicate with the aggregator system;
    pre-populate data fields on the content page based on the data corresponding to at least a subset of the CRM information received from the aggregation system; and
  client device identification circuitry coupled to the carrier input circuitry and configured to identify the client device based on the client device identification information and to cause the data corresponding to at least a subset of the CRM information to be communicated to the client device based at least in part on the client device identification information.

2. The system of claim 1 further comprising authentication circuitry configured to authenticate a user in possession of the client device.

3. The system of claim 2, further comprising client device input circuitry configured to receive consent of the user, wherein the carrier input circuitry is configured to receive the CRM information based on the consent.

4. The system of claim 2, wherein the client device identification circuitry is further configured to cause the data corresponding to at least a subset of the CRM information to be communicated to the client device based at least in part on the user in possession of the client device being authenticated.

5. The system of claim 2, wherein the authentication circuitry is further configured to generate two authentication keys and merchant identification information, and to cause one of the two authentication keys and the merchant identification information to be communicated to a merchant system.

6. The system of claim 5, wherein the merchant system is configured to perform a hash operation on the merchant identification information using a hash function in order to generate hashed merchant identification information, and wherein the merchant system is further configured to communicate the hashed merchant identification information to the client device.

7. The system of claim 1, wherein the client device is coupled to the merchant system configured to generate a payload comprising at least one of correlation identification information, a timestamp value, a nonce value, and any combination thereof, wherein the merchant system is further configured to encrypt the payload to generate an encrypted payload, and wherein the merchant system is further configured to communicate the encrypted payload to the client device.

8. The system of claim 1, further comprising client device input circuitry coupled to the client device and configured to receive from the client device an identification call comprising a request object, a success handler, and an error handler, and wherein the execution of the identification call causes carrier identifying information and an authentication key to be communicated to the client device.

9. The system of claim 8, wherein the request object comprises at least one of hashed merchant identification information, an encrypted payload, a method name, one or more request-specific parameters, and any combination thereof.

10. The system of claim 8, wherein the client device input circuitry is further configured to receive from the client device a request for information call comprising a request object, a success handler, an error handler, and a pre-populating parameter, and wherein the execution of the request for information call causes the data corresponding to at least a subset of the CRM information to be communicated to the client device based at least in part on the authentication key.

11. The system of claim 10, wherein the request object comprises at least one of hashed merchant identification information, an encrypted payload, a method name, one or more request-specific parameters, and any combination thereof.

12. The system of claim 1, wherein the client device identification circuitry is configured to identify the client device based on a mobile originated message identification technique.

13. The system of claim 1, wherein the client device identification circuitry is configured to identify the client device based on a header enrichment identification technique.

14. The system of claim 1, wherein the CRM information is associated with a user in possession of the client device and comprises at least one of a name, an address, and billing information.

15. The system of claim 1, wherein the client device is configured to use the data corresponding to at least a subset of the CRM information as part of a transaction with the merchant system.

16. The system of claim 1, wherein the client device identification information comprises a mobile phone number corresponding to the client device.

17. A method comprising:
identifying, by an aggregator system, a client device based on client device identification information received from a carrier system;
receiving, by the aggregator system, customer relationship management (CRM) information from the carrier system; and
outputting, by the aggregator system, data corresponding to at least a subset of the CRM information to the client device based at least in part on the client device identification information, wherein the client device is configured to:
  receive a content page from a merchant system;
  receive a selectable software import from the merchant system allowing the client device to directly communicate with the aggregator system;
  pre-populate data fields on the content page based on the data corresponding to at least a subset of the CRM information received from the aggregation system.

18. The method of claim 17, further comprising authenticating a user in possession of the client device.

19. The method of claim 18, further comprising receiving consent of the user from the client device, and wherein the CRM information is received based on the consent.

20. The method of claim 18, wherein outputting the data corresponding to at least a subset of the CRM information to the client device is based at least in part on the user in possession of the client device being authenticated.

21. The method of claim 17, wherein the merchant system is configured to provide software imports to the client device, and wherein the software imports allow the client device to interact with the aggregator system directly.

22. A non-transitory computer readable medium having stored instructions that when executed directs:
  carrier input circuitry, in an aggregator system, to receive client device identification information from a carrier system;
  client device identification circuitry, in the aggregator system, to identify a client device based on the client device identification information;
  the carrier input circuitry to receive customer relationship management (CRM) information from the carrier system; and
  communication circuitry, in the aggregator system, to output data corresponding to at least a subset of the CRM information to the client device based at least in part on the client device identification information, wherein the client device is configured to:
    receive a content page from a merchant system;
    receive a selectable software import from the merchant system allowing the client device to directly communicate with the aggregator system;
    pre-populate data fields on the content page based on the data corresponding to at least a subset of the CRM information received from the aggregation system.

23. A system comprising:
  an aggregator system comprising:
    carrier input circuitry coupled to a carrier system and configured to receive customer relationship management (CRM) information from the carrier system;
    merchant input circuitry coupled to a merchant system, wherein the merchant system stores client device identification information comprising a unique identifier associated with the client device, and wherein the merchant input circuitry is configured to receive the client device identification information from the merchant system;
    client device output circuitry coupled to a client device and configured to provide data to the client device corresponding to at least a subset of the CRM information, wherein the client device is configured to pre-populate data fields based on the data corresponding to at least a subset of the CRM information; and
    client device identification circuitry coupled to the merchant input circuitry and configured to identify the client device based on the client device identification information and to cause the data corresponding to at least a subset of the CRM information to be communicated to the client device based at least in part on the client device identification information.

24. The system of claim 23 further comprising authentication circuitry configured to authenticate a user in possession of the client device.

25. The system of claim 24, further comprising client device input circuitry configured to receive consent of the user, wherein the carrier input circuitry is configured to receive the CRM information based on the consent.

26. The system of claim 24, wherein the client device identification circuitry is further configured to cause the data corresponding to at least a subset of the CRM information to be communicated to the client device based at least in part on the user in possession of the client device being authenticated.

27. The system of claim 24, wherein the authentication circuitry is further configured to generate two authentication keys and merchant identification information, and to cause one of the two authentication keys and the merchant identification information to be communicated to a merchant system.

28. The system of claim 27, wherein the merchant system is configured to perform a hash operation on the merchant identification information using a hash function in order to generate hashed merchant identification information, and wherein the merchant system is further configured to communicate the hashed merchant identification information to the client device.

29. The system of claim 23, wherein the client device is coupled to the merchant system configured to generate a payload comprising at least one of correlation identification information, a timestamp value, a nonce value, and any combination thereof, wherein the merchant system is further configured to encrypt the payload to generate an encrypted payload, and wherein the merchant system is further configured to communicate the encrypted payload to the client device.

30. The system of claim 23, wherein a merchant system is configured to provide software imports to the client device, and wherein the software imports allow the client device to interact with the aggregator system directly.

31. The system of claim 30, further comprising client device input circuitry coupled to the client device and configured to receive from the client device an identification call comprising a request object, a success handler, and an error handler, and wherein the execution of the identification call causes carrier identifying information and an authentication key to be communicated to the client device.

32. The system of claim 31, wherein the request object comprises at least one of hashed merchant identification information, an encrypted payload, a method name, one or more request-specific parameters, and any combination thereof.

33. The system of claim 31, wherein the client device input circuitry is further configured to receive from the client device a request for information call comprising a request object, a success handler, an error handler, and a pre-populating parameter, and wherein the execution of the request for information call causes the data corresponding to at least a subset of the CRM information to be communicated to the client device based at least in part on the authentication key.

34. The system of claim 33, wherein the request object comprises at least one of hashed merchant identification information, an encrypted payload, a method name, one or more request-specific parameters, and any combination thereof.

35. The system of claim 23, wherein the client device identification circuitry is configured to identify the client device based on a mobile originated message identification technique.

36. The system of claim 23, wherein the client device identification circuitry is configured to identify the client device based on a header enrichment identification technique.

37. The system of claim 23, wherein the CRM information is associated with a user in possession of the client device and comprises at least one of a name, an address, and billing information.

38. The system of claim 23, wherein the client device is configured to use the data corresponding to at least a subset of the CRM information as part of a transaction with the merchant system.

39. The system of claim 23, wherein the client device identification information comprises a mobile phone number corresponding to the client device.

40. A system comprising:
a carrier system comprising:
client device input circuitry coupled to a client device and configured to receive client device identification information from the client device; and
aggregator output circuitry coupled to an aggregator system and configured to provide customer relationship management (CRM) information and the client device identification information to the aggregator system, wherein the aggregator system is configured to:
identify the client device based on the client device identification information; and
output data corresponding to at least a subset of the CRM information to the client device based on the client device identification information;
wherein the client device is configured to:
receive a content page from a merchant system;
receive a selectable software import from the merchant system allowing the client device to directly communicate with the aggregator system;
pre-populate data fields on the content page based on the data corresponding to at least a subset of the CRM information received from the aggregation system.

41. A system comprising:
a merchant system comprising:
client device input circuitry coupled to a client device and configured to receive client device identification information from the client device; and
aggregator output circuitry coupled to an aggregator system and configured to provide the client device identification information to the aggregator system, wherein the aggregator system is configured to:
identify the client device based on the client device identification information;
receive customer relationship management (CRM) information from a carrier system; and
output data corresponding to at least a subset of the CRM information to the client device based at least in part on the client device identification information;
wherein the client device is configured to:
receive a content page from a merchant system;
receive a selectable software import from the merchant system allowing the client device to directly communicate with the aggregator system;
pre-populate data fields on the content page based on the data corresponding to at least a subset of the CRM information received from the aggregation system.

* * * * *